(12) United States Patent
Phillips et al.

(10) Patent No.: US 7,095,482 B2
(45) Date of Patent: *Aug. 22, 2006

(54) MULTIPLE SYSTEM VIBRATION ISOLATOR

(75) Inventors: Alton H. Phillips, East Palo Alto, CA (US); Douglas C. Watson, Campbell, CA (US); Andrew J. Hazelton, Tokyo (JP)

(73) Assignee: Nikon Corporation, Tokyo (JP)

( * ) Notice: Subject to any disclaimer, the term of this patent is extended or adjusted under 35 U.S.C. 154(b) by 178 days.

This patent is subject to a terminal disclaimer.

(21) Appl. No.: 10/186,876

(22) Filed: Jun. 28, 2002

(65) Prior Publication Data

Related U.S. Application Data

(63) Continuation-in-part of application No. 09/818,163, filed on Mar. 27, 2001, now Pat. No. 6,731,372.

(51) Int. Cl.
*G03B 27/42* (2006.01)
*F16M 13/00* (2006.01)
*F01B 7/00* (2006.01)

(52) U.S. Cl. ................ 355/53; 248/562; 248/636; 92/151

(58) Field of Classification Search ............ 355/53, 355/72, 73, 75, 76; 464/180; 248/562, 564, 248/636; 92/143, 151, 152
See application file for complete search history.

(56) References Cited

U.S. PATENT DOCUMENTS 3,249,330 A * 5/1966 Preis ................... 248/563
5,701,041 A * 12/1997 Akutsu et al. ............ 310/12
5,725,329 A * 3/1998 Chelminski ............. 405/232
6,036,162 A * 3/2000 Hayashi .................. 248/550
6,144,442 A    11/2000 'T Mannetje et al.
6,226,075 B1* 5/2001 Loopstra et al. .......... 355/76
6,327,024 B1* 12/2001 Hayashi et al. ........... 355/53
6,457,703 B1* 10/2002 Yamamoto et al. .... 267/140.11
6,731,372 B1* 5/2004 Binnard et al. ........... 355/53

FOREIGN PATENT DOCUMENTS

| EP | 0 973 067 | 1/2000 |
| EP | 1 160 628 | 12/2001 |
| JP | 61-235712 | 10/1986 |
| JP | 62-60568 | 12/1987 |
| JP | 60-78125 | 3/1994 |
| WO | WO 99/05573 | 2/1999 |
| WO | WO 99/22272 | 5/1999 |

* cited by examiner

*Primary Examiner*—Rodney Fuller
(74) *Attorney, Agent, or Firm*—Steven G. Roeder; James P. Broder

(57) ABSTRACT

A vibration isolator (200) for isolating a first assembly (206) from vibration from a second assembly (208) includes a first system (202) and a second system (204) coupled to the first system (202). In one embodiment, the first system (202) supports the majority of the first assembly (206) relative to the second assembly (208) and the second system (204) adjusts for a change in the location of the center of gravity of the first assembly (206). Further, the second system (204) can be used to compensate for fluctuations in the atmospheric pressure near the vibration isolator (200).

102 Claims, 14 Drawing Sheets

MULTIPLE SYSTEM VIBRATION ISOLATOR

CROSS-REFERENCE TO RELATED APPLICATION

This application is a Continuation-in-Part application of U.S. application Ser. No. 09/818,163, filed on Mar. 27, 2001, and entitled "Multiple Chamber Fluid Mount", which issued as U.S. Pat. No. 6,731,372, to Mike Binnard and Douglas C. Watson.

FIELD OF THE INVENTION

The present invention is directed to a vibration isolator. More specifically, the present invention is directed to a vibration isolator for an exposure apparatus and a method for making a vibration isolator for isolating vibration.

BACKGROUND

Exposure apparatuses are commonly used to transfer images from a reticle onto a semiconductor wafer during semiconductor processing. A typical exposure apparatus includes a frame assembly, a measurement system, a control system, an illumination source, a projection optical assembly, a reticle stage for retaining a reticle, and a wafer stage for retaining a semiconductor wafer.

The frame assembly typically supports the measurement system, the illumination source, the reticle stage, the projection optical assembly, and the wafer stage above the ground. The measurement system monitors the positions of the stages relative to a reference such as the projection optical assembly. The projection optical assembly projects and/or focuses the light that passes through the reticle. One or more movers precisely position the reticle stage relative to the projection optical assembly. Similarly, one or more movers precisely position the wafer stage relative to the projection optical assembly.

The size of the images and the features within the images transferred onto the wafer from the reticle are extremely small. Accordingly, the precise positioning of the wafer and the reticle relative to the optical assembly is critical to the manufacture of high density, semiconductor wafers.

Unfortunately, mechanical vibrations and deformations in the frame assembly of the exposure apparatus can influence the accuracy of the exposure apparatus. For example, the movers utilized to move the stages generate reaction forces that vibrate and deform the frame assembly of the exposure apparatus. Further, the ground can transfer vibration to the frame assembly.

The vibrations and deformations in the frame assembly can move the stages and the projection optical assembly out of precise relative alignment. Further, the vibrations and deformations in the frame assembly can cause the measurement system to improperly measure the positions of the stages relative to the projection optical assembly. Additionally, vibration of the projection optical assembly can cause deformations of the optical elements within the projection optical assembly and degrade the optical imaging quality. As a result thereof, the accuracy of the exposure apparatus and the quality of the integrated circuits formed on the wafer can be compromised.

One attempt to solve this problem involves the use of one or more air mounts to secure the frame assembly to the ground. The air mounts utilize a cushion of pressurized air to reduce the effect of vibration of the ground causing vibration to the frame assembly. Similarly, one or more air mounts can be used to support the components of the exposure apparatus on the frame assembly. Unfortunately, existing air mounts with adequate damping capacity have a relatively high natural frequency and are relatively stiff.

In light of the above, there is a need for an exposure apparatus with an improved isolation system. Additionally, there is a need for a vibration isolator with sufficient capacity that has a relatively low natural frequency and is not as stiff as air mounts with comparable capacity. Further, there is a need for an exposure apparatus capable of manufacturing precision devices, such as high density, semiconductor wafers.

SUMMARY

The present invention is directed to a vibration isolator for isolating a first assembly from vibration from a second assembly. The vibration isolator includes a first system and a second system coupled to the first system. In one embodiment, the first system supports the majority of the first assembly relative to the second assembly and the second system adjusts for a change in the location of the center of gravity of the first assembly, compensate for fluctuations in the atmospheric pressure near the vibration isolator, and/or a changing load.

A number of embodiments of the vibration isolator are provided herein. In many of these embodiments, the first system functions differently from the second system. In a number of these embodiments, the first system includes a first cylinder and a first piston that moves within the first cylinder. The first piston cooperates with the first cylinder to define a first chamber that is maintained at a pressure that is less than the atmospheric pressure. The vacuum type first system is not very stiff and has a relatively low natural frequency. Alternately, for example, the first system can include a permanent magnet section, a magnetically permeable section that is attracted to the magnet section and a mover assembly that moves one of the sections relative to the other section to adjust the lift of the first system.

In contrast, the second system can include a second cylinder and a second piston that moves within the second cylinder. The second piston cooperates with the second cylinder to define a second chamber that is maintained at a pressure that is greater than the atmospheric pressure. Alternately, the second system can include a mover such as a voice coil motor. Still alternately, the second system can include a mass controller that adds and/or removes mass to the first assembly.

Additionally, the vibration isolator can include a third system that is coupled to the other system. The third system, for example, can include a third cylinder and a third piston that cooperate to define a third chamber that is maintained below atmospheric pressure. The third system increases the load capacity of the vibration isolator while reducing the footprint of the vibration isolator.

The vibration isolator is particularly useful as part of an exposure apparatus. For example, one or more vibration isolators can be used as part of a frame isolation system that secures a frame assembly of the exposure apparatus to a mounting base. With this design, the frame isolation system reduces the effect of vibration of the mounting base causing vibration on the frame assembly and the components that are secured to the frame assembly.

Further, one or more of the vibration isolators can be used to secure one or more other assemblies of the exposure apparatus to the frame assembly. For example, one or more vibration isolators could be used as part of an isolation system to secure a stage assembly or an optical assembly to the frame assembly. With this design, the isolation system reduces the effect of vibration of the frame assembly causing vibration on the stage assembly or the optical assembly.

The present invention is also directed to a device made with the exposure apparatus, a wafer made with the exposure apparatus, a method for making a vibration isolator, a method for making an isolation system, a method for making an exposure apparatus, a method for making a device, and a method for making a wafer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
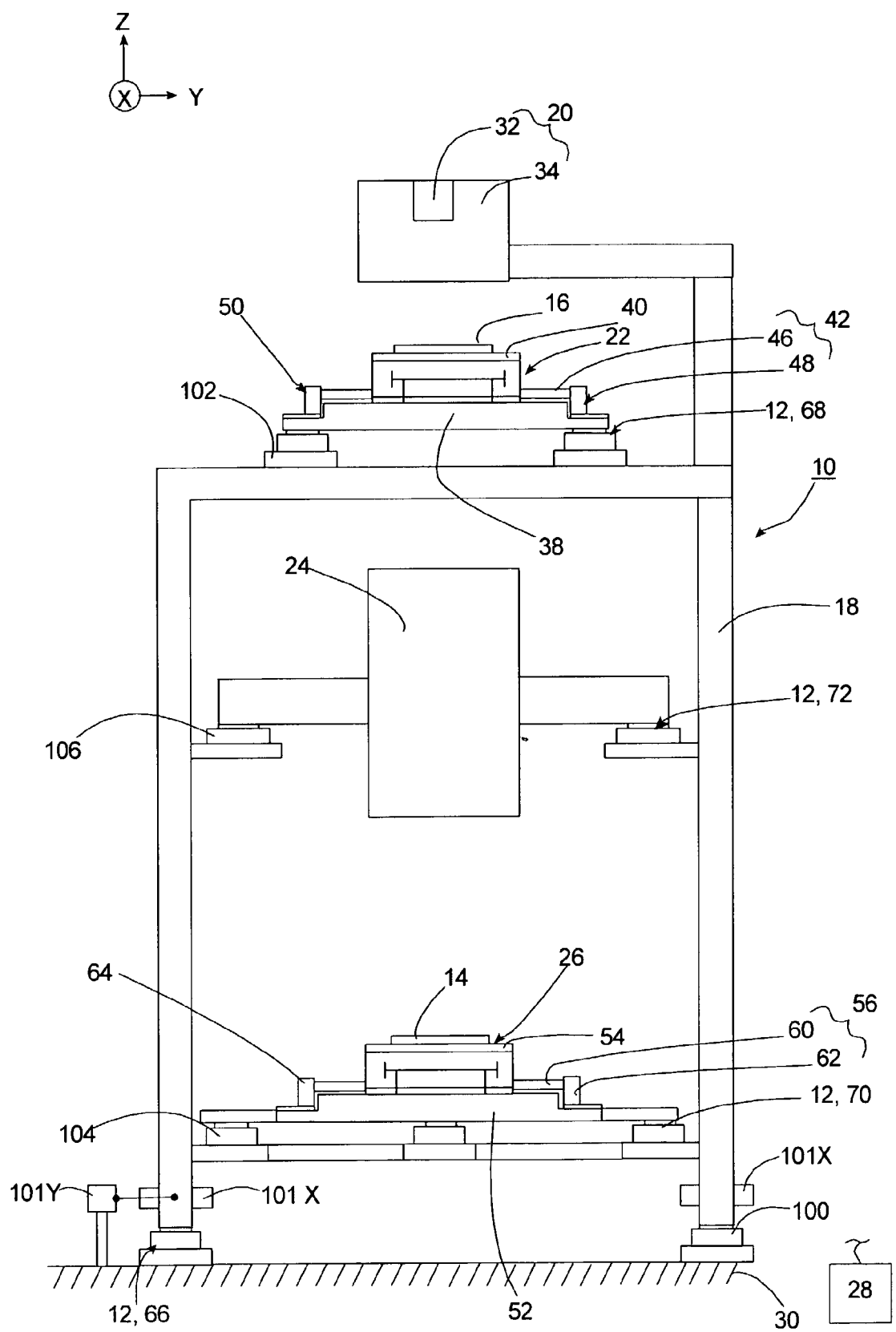
FIG. 1 is a side illustration of an exposure apparatus having features of the present invention.

FIG. 1 illustrates an apparatus 10 that includes one or more isolation assemblies 12 that isolate the apparatus 10 or a portion of the apparatus 10 from vibration. The type of apparatus 10 can be varied. For example, the apparatus 10 can be used to manufacture, measure and/or inspect a device 14. The type of device 14 manufactured or inspected by the apparatus 10 can be varied. For example, the device 14 can be a semiconductor wafer, and the isolation assemblies 12 can be used as part of an exposure apparatus 10 that precisely transfers an image of an integrated circuit from an object 16 such as a reticle onto the semiconductor wafer 14.

Some of the Figures provided herein include a coordinate system that designates an X axis, a Y axis that is orthogonal to the X axis, and a Z axis that is orthogonal to the X axis and the Y axis. It should be understood that the coordinate system is merely for reference and can be varied. For example, the Z axis can be switched with the Y axis or the X axis and/or the apparatus 10 can be rotated. Further, the X axis, the Y axis, and the Z axis can be referred to as the first axis, the second axis, and the third axis. As used herein, the term six degrees of freedom shall include movement along the X axis, along the Y axis, along the Z axis, about the X axis, about the Y axis and about the Z axis.

The exposure apparatus 10 illustrated in FIG. 1 also includes a frame assembly 18, an illumination system 20 (irradiation apparatus), a reticle stage assembly 22, a projection optical assembly 24, a wafer stage assembly 26, and a control system 28. The exposure apparatus 10 mounts to a mounting base 30, e.g., the ground, a base, or floor or some other supporting structure.

There are a number of different types of exposure apparatuses 10. For example, the exposure apparatus 10 can be used as scanning type photolithography system that exposes the pattern from the reticle 16 onto the wafer 14 with the reticle 16 and the wafer 14 moving synchronously. In a scanning type lithographic device, the reticle 16 is moved perpendicular to an optical axis of the projection optical assembly 24 by the reticle stage assembly 22 and the wafer 14 is moved perpendicular to the optical axis of the projection optical assembly 24 by the wafer stage assembly 26. Scanning of the reticle 16 and the wafer 14 occurs while the reticle 16 and the wafer 14 are moving synchronously.

Alternately, the exposure apparatus 10 can be a step-and-repeat type photolithography system that exposes the reticle 16 while the reticle 16 and the wafer 14 are stationary. In the step and repeat process, the wafer 14 is in a constant position relative to the reticle 16 and the projection optical assembly 24 during the exposure of an individual field. Subsequently, between consecutive exposure steps, the wafer stage assembly 26 consecutively moves the wafer 14 perpendicular to the optical axis of the projection optical assembly 24 so that the next field of the wafer 14 is brought into position relative to the projection optical assembly 24 and the reticle 16 for exposure. Following this process, the images on the reticle 16 are sequentially exposed onto the fields of the wafer 14 so that the next field of the wafer 14 is brought into position relative to the projection optical assembly 24 and the reticle 16.

However, the use of the exposure apparatus 10 and the isolation assemblies 12 is not limited to a photolithography system for semiconductor manufacturing. The apparatus 10, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern by closely locating a mask and a substrate without the use of a projection optical assembly. Additionally, the present invention provided herein can be used in other devices, including other semiconductor processing equipment.

The frame assembly 18 is rigid and supports the components of the exposure apparatus 10. The design of the frame assembly 18 can be varied to suit the design requirements for the rest of the exposure apparatus 10. The frame assembly 18 illustrated in FIG. 1 supports the projection optical assembly 24, the illumination system 20, the reticle stage assembly 22 and the wafer stage assembly 26 above the mounting base 30.

The illumination system 20 includes an illumination source 32 and an illumination optical assembly 34. The illumination source 32 emits the beam (irradiation) of light energy. The illumination source 32 can be g-line (436 nm), i-line (365 nm), KrF excimer laser (248 nm), ArF excimer laser (193 nm) and $F_2$ laser (157 nm). Alternately, the illumination source 32 can also use charged particle beams such as an x-ray and electron beam. For instance, in the case where an electron beam is used, thermionic emission type lanthanum hexaboride ($LaB_6$) or tantalum (Ta) can be used as an electron gun. Furthermore, in the case where an electron beam is used, the structure could be such that either a mask is used or a pattern can be directly formed on a substrate without the use of a mask.

The illumination optical assembly 34 guides the beam of light energy from the illumination source 32 to the reticle 16. The beam illuminates selectively different portions of the reticle 16 and exposes the semiconductor wafer 14. In FIG. 1, the illumination source 32 is illustrated as being supported above the reticle stage assembly 22. Typically, however, the illumination source 32 is secured to one of the sides of the frame assembly 18 and the energy beam from the illumination source 32 is directed to above the reticle 16 with the illumination optical assembly 34.

The reticle stage assembly 22 holds and positions the reticle 16 relative to the optical assembly 24 and the wafer 14. The design of the reticle stage assembly 22 can vary to suit the design requirements of the apparatus 10. In the embodiment illustrated in FIG. 1, the reticle stage assembly 22 includes a reticle stage base 38, a reticle stage 40, and a reticle stage mover assembly 42.

The reticle stage base 38 supports the reticle stage 40 above the mounting base 30. In the embodiment illustrated in FIG. 1, the reticle stage base 38 is generally rectangular shaped and includes a planar base top (sometimes referred to as a guide face), an opposed planar base bottom (not shown), and four base sides.

The reticle stage 40 retains the reticle 16. The reticle stage 40 can include a device holder such as a vacuum chuck, an electrostatic chuck, or some other type of clamp. The reticle stage 40 is somewhat rectangular shaped. A bearing (not shown) maintains the reticle stage 40 spaced apart along the Z axis relative to the reticle stage base 38 and allows for motion of the reticle stage 40 along the X axis, along the Y axis and about the Z axis relative to the reticle stage base 38.

The reticle stage mover assembly 42 controls and moves the reticle stage 40 relative to the reticle stage base 38. The design of the reticle stage mover assembly 42 and the movement of the reticle stage 40 can be varied to suit the movement requirements of the apparatus 10. In the embodiment illustrated in FIG. 1, the reticle stage 40 moves relative to the reticle stage base 38 along the X axis, along the Y axis and about the Z axis. In this embodiment, the reticle stage mover assembly 42 includes a guide bar 46, a first X stage mover 48, a second X stage mover 50, and a Y stage mover (not shown). More specifically, in this embodiment, (i) the X stage movers 48, 50 move the guide bar 46, the reticle stage 40 and the reticle 16 along the X axis and about the Z axis (theta Z), and (ii) the Y stage mover moves the reticle stage 40 along the Y axis relative to the guide bar 46.

The design of each mover 48, 50 can be varied to suit the movement requirements of the apparatus 10. As provided herein, each of the movers 48, 50 can include one or more rotary motors, voice coil motors, linear motors, electromagnetic actuators, or some other force actuators. In the embodiment illustrated in FIG. 1, each of the movers 48, 50 is a commutated, linear motor. Electrical current (not shown) is individually supplied to each mover 48, 50 by the control system 28 to precisely position the reticle 16.

The reticle stage assembly 22 can include a reticle measurement system (not shown) that monitors the position of the reticle stage 40 relative to the projection optical assembly 24 or some other reference. With this information, the reticle stage mover assembly 42 can be used to precisely position the reticle stage 40. For example, the reticle measurement system can utilize laser interferometers, encoders, sensors, and/or other measuring devices.

The projection optical assembly 24 projects, directs and/or focuses the beam of light energy passing through the projection optical assembly 24. The design of the projection optical assembly 24 can be varied according to its design requirements. For example, the projection optical assembly 24 can magnify or reduce the image to be illuminated onto the device 14. The projection optical assembly 24 need not be limited to a magnification or a reduction system. The projection optical assembly 24 could also be a 1× system.

With respect to the projection optical assembly 24, when far ultra-violet rays such as the excimer laser is used, glass materials such as quartz and fluorite that transmit far ultra-violet rays is preferable to be used. When the $F_2$ type laser or x-ray is used, the projection optical assembly 24 should preferably be either catadioptric or refractive (a reticle should also preferably be a reflective type), and when an electron beam is used, electron optics should preferably consist of electron lenses and deflectors. The optical path for the electron beams should be in a vacuum.

Also, with an exposure device 10 that employs vacuum ultra-violet radiation (VUV) of wavelength 200 nm or lower, use of the catadioptric type optical system can be considered. Examples of the catadioptric type of optical system include the disclosure Japan Patent Application Disclosure No.8-171054 published in the Official Gazette for Laid-Open Patent Applications and its counterpart U.S. Pat. No. 5,668,672, as well as Japan Patent Application Disclosure No.10-20195 and its counterpart U.S. Pat. No. 5,835,275. In these cases, the reflecting optical device can be a catadioptric optical system incorporating a beam splitter and concave mirror. Japan Patent Application Disclosure No.8-334695 published in the Official Gazette for Laid-Open Patent Applications and its counterpart U.S. Pat. No. 5,689,377 as well as Japan Patent Application Disclosure No.10-3039 and its counterpart U.S. patent application Ser. No. 873,605 (Application Date: Jun. 12, 1997) also use a reflecting-refracting type of optical system incorporating a concave mirror, etc., but without a beam splitter, and can also be employed with this invention. As far as is permitted, the disclosures in the above-mentioned U.S. patents, as well as the Japan patent applications published in the Official Gazette for Laid-Open Patent Applications are incorporated herein by reference.

The wafer stage assembly 26 holds and positions the wafer 14 with respect to the adjusted projected image of the illuminated portions of the reticle 16. The design of the wafer stage assembly 26 can vary to suit the design requirements of the apparatus 10. In the embodiment illustrated in FIG. 1, the wafer stage assembly 26 includes a wafer stage base 52, a wafer stage 54, and a wafer stage mover assembly 56.

The wafer stage base 52 supports the wafer stage 54 above the mounting base 30. In the embodiment illustrated in FIG. 1, the wafer stage base 52 is generally rectangular shaped and includes a planar base top (sometimes referred to as a guide face), an opposed planar base bottom (not shown), and four base sides.

The wafer stage 54 retains the wafer 14. The wafer stage 54 can include a device holder such as a vacuum chuck, an electrostatic chuck, or some other type of clamp. The wafer stage 54 is somewhat rectangular shaped. A bearing (not shown) maintains the wafer stage 54 spaced apart along the Z axis relative to the wafer stage base 52 and allows for motion of the wafer stage 54 along the X axis, along the Y axis and about the Z axis relative to the wafer stage base 52.

The wafer stage mover assembly 56 controls and moves the wafer stage 54 relative to the wafer stage base 52. The design of the wafer stage mover assembly 56 and the movement of the wafer stage 54 can be varied to suit the movement requirements of the apparatus 10. In the embodiment illustrated in FIG. 1, the wafer stage 54 moves relative to the wafer stage base 52 along the X axis, along the Y axis and about the Z axis. In this embodiment, the wafer stage mover assembly 56 includes a guide bar 60, a first X stage mover 62, a second X stage mover 64, and a Y stage mover (not shown). More specifically, in this embodiment, (i) the X stage movers 62, 64 move the guide bar 60, the wafer stage 54 and the wafer 14 along the X axis and about the Z axis (theta Z), and (ii) the Y stage mover moves the wafer stage 54 along the Y axis relative to the guide bar 60.

The design of each mover 62, 64 can be varied to suit the movement requirements of the apparatus 10. As provided herein, each of the movers 62, 64 can include one or more rotary motors, voice coil motors, linear motors, electromagnetic actuators, or some other force actuators. In the embodiment illustrated in FIG. 1, each of the movers 62, 64 is a commutated, linear motor. Electrical current (not shown) is individually supplied to each mover 62, 64 by the control system 28 to precisely position the wafer 14.

The wafer stage assembly 26 can include a wafer measurement system (not shown) that monitors the position of the wafer stage 54 relative to the projection optical assembly 24 or some other reference. With this information, the wafer stage mover assembly 56 can be used to precisely position the wafer stage 54. For example, the wafer measurement system can utilize laser interferometers, encoders, sensors, and/or other measuring devices.

Further, in photolithography systems, when linear motors (see U.S. Pat. Nos. 5,623,853 or 5,528,118) are used in a wafer stage assembly or a reticle stage assembly, the linear motors can be either an air levitation type employing air bearings or a magnetic levitation type using Lorentz force or reactance force. Additionally, the stage could move along a guide, or it could be a guideless type stage that uses no guide. As far as is permitted, the disclosures in U.S. Pat. Nos. 5,623,853 and 5,528,118 are incorporated herein by reference.

Alternatively, one of the stages could be driven by a planar motor, which drives the stage by an electromagnetic force generated by a magnet unit having two-dimensionally arranged magnets and an armature coil unit having two-dimensionally arranged coils in facing positions. With this type of driving system, either the magnet unit or the armature coil unit is connected to the stage and the other unit is mounted on the moving plane side of the stage.

Movement of the stages as described above generates reaction forces that can affect performance of the photolithography system. Reaction forces generated by the wafer (substrate) stage motion can be mechanically released to the floor (ground) by use of a frame member as described in U.S. Pat. No. 5,528,118 and published Japanese Patent Application Disclosure No. 8-166475. Additionally, reaction forces generated by the reticle (mask) stage motion can be mechanically released to the floor (ground) by use of a frame member as described in U.S. Pat. No. 5,874,820 and published Japanese Patent Application Disclosure No. 8-330224. As far as is permitted, the disclosures in U.S. Pat. Nos. 5,528,118 and 5,874,820 and Japanese Patent Application Disclosure No. 8-330224 are incorporated herein by reference.

Each isolation assembly 12 inhibits vibration from a first assembly from being transferred to a second assembly. Further, each isolation assembly 12 can adjust the position of the first assembly relative to the second assembly with at least three degrees of freedom. Additionally, each isolation assembly 12 can adjust the position of the first assembly relative to the second assembly with six three degrees of freedom. Details of isolations assemblies can be found in U.S. Pat. No. 5,701,041, U.S. Pat. No. 6,226,075, U.S. Pat. No. 6,144,442, EP 0973067, WO 99/05573, and WO 99/22272, as far a permitted, the disclosures of which are incorporated herein by reference.

In the embodiment illustrated in FIG. 1, the exposure apparatus 10 includes a frame isolation system 66, a reticle stage isolation system 68, a wafer stage isolation system 70, and an optical isolation system 72. The design of each isolation assembly 12 can be varied to suit the design requirements of the apparatus 10.

In FIG. 1, the frame isolation system 66 secures the frame assembly 18 to the mounting base 30. With this design, the frame isolation system 66 reduces the effect of vibration of the mounting base 30 (the second assembly) causing vibration on the frame assembly 18 (the first assembly) and the components of the exposure apparatus 10 that are secured to the frame assembly 18. In this embodiment, the frame isolation system 66 includes a plurality of spaced apart vibration isolators 100 that support the weight of the frame assembly 18, while remaining low in stiffness for good passive vibration isolation of the frame assembly 18 relative to the mounting base 30. The number of vibration isolators 100 in the frame isolation system 66 can be varied. For example, the frame isolation system 66 can include three spaced apart vibration isolators 100.

Further, in this embodiment, the frame isolation system 66 moves and positions the frame assembly 18 relative to the mounting base 30 base with six degrees of freedom. More specifically, the vibration isolators 100 adjust the position of the frame assembly 18 relative to the mounting base 30 along the Z axis, about the X axis and about the Y axis. Additionally, the frame isolation system 66 includes one or more movers for adjusting the position of the frame assembly 18 relative to the mounting base 30 along the X axis, along the Y axis and about the Z axis. In FIG. 1, the frame isolation system 66 includes (i) two spaced apart X movers 101X that move the frame assembly 18 relative to the mounting base 30 along the X axis and about the Z axis, and (ii) a Y mover 101Y that moves the frame assembly 18 relative to the mounting base 30 along the Y axis.

The design of each mover 101X, 101Y can be varied to suit the movement requirements of the apparatus 10. As provided herein, each of the movers 101X, 101Y can include one or more rotary motors, voice coil motors, linear motors, electromagnetic actuators, or some other force actuators. In the embodiment illustrated in FIG. 1, each of the movers 101X, 101Y is a voice coil motor. Electrical current (not shown) is individually supplied to each mover 101X, 101Y by the control system 28 to precisely position the frame assembly 18.

In one embodiment, the control system 28 actively controls the vibration isolators 100 to compensate for low frequency disturbances such as a shift in the center of gravity in one the stage assemblies 22, 26.

The position and acceleration of the frame assembly 18 relative to the mounting base 30 can be monitored with one or more position and/or acceleration sensors (not shown). With information from the sensors, the control system 28 can control the frame isolation system 66 to adjust and control the position of the frame assembly 18 relative to the mounting base 30.

The reticle stage isolation system 68 secures and supports the reticle stage base 38 to the frame assembly 18 and reduces the effect of vibration of the frame assembly 18 causing vibration to the reticle stage base 38. In this embodiment, the reticle stage isolation system 68 includes a plurality of spaced apart vibration isolators 102 that support the weight of the reticle stage base 38 and adjust the position of the reticle stage base 38 with three degrees of freedom, while remaining low in stiffness for good passive vibration isolation of the reticle stage base 38 relative to the frame assembly 18. Alternately, the reticle stage isolation system 68 can be designed to move the reticle stage base 38 with six degrees of freedom.

In this embodiment, the control system 28 actively controls the vibration isolators 102 to compensate for low frequency disturbances, to adjust the static or low frequency position of the reticle stage base 38, to improve vibration isolation by reducing the stiffness, and/or to compensate for a change or shift in the center of gravity of the reticle stage assembly 22. In one embodiment, the position and acceleration of the reticle stage base 38 is monitored with one or more position and/or acceleration sensors (not shown). With information from the sensors, the control system 28 can cooperate with the reticle stage isolation system 68 to adjust and control the position of the reticle stage base 38.

The wafer stage isolation system 70 secures and supports the wafer stage base 52 to the frame assembly 18 and reduces the effect of vibration of the frame assembly 18 causing vibration to the wafer stage base 52. In this embodiment, the wafer stage isolation system 70 includes a plurality of spaced apart vibration isolators 104 and the control system 28 actively controls the vibration isolators 104 to compensate for low frequency disturbances, to adjust the static or low frequency position of the wafer stage base 52, to adjust the position of the wafer stage base 52 with three degrees of freedom and to improve vibration isolation by reducing the stiffness, and/or to compensate for a change or shift in the center of gravity of the wafer stage assembly 26. Alternately, the wafer stage isolation system 70 can be designed to move the wafer stage base 52 with six degrees of freedom.

In one embodiment, the position and acceleration of the wafer stage base 52 is monitored with one or more position and/or acceleration sensors (not shown). With information from the sensors, the control system 28 can cooperate with the wafer stage isolation system 70 to adjust and control the position of the wafer stage base 52.

The optical isolation system 72 secures and supports the projection optical assembly 24 relative to the frame assembly 18 and reduces the effect of vibration of the frame assembly 18 causing vibration to the projection optical assembly 24. The optical isolation system 72 is similar to the other isolation systems discussed above. In this embodiment, the optical isolation system 72 includes a plurality of vibration isolators 106 and the control system 28 actively controls vibration isolators 106 to position the optical assembly 24, to compensate for low frequency disturbances, to adjust the static or low frequency position of the optical assembly 24 and to improve vibration isolation by reducing the stiffness. The control system 28 controls the actuators 106 to actively damp and control the position of the projection optical assembly 24. In one embodiment, the position and acceleration of the projection optical assembly 24 is monitored with one or more position and/or acceleration sensors (not shown). With information from the sensors, the control system 28 can cooperate with the optical isolation system 72 to adjust and control the position of the projection optical assembly 24.

Figure 2A:
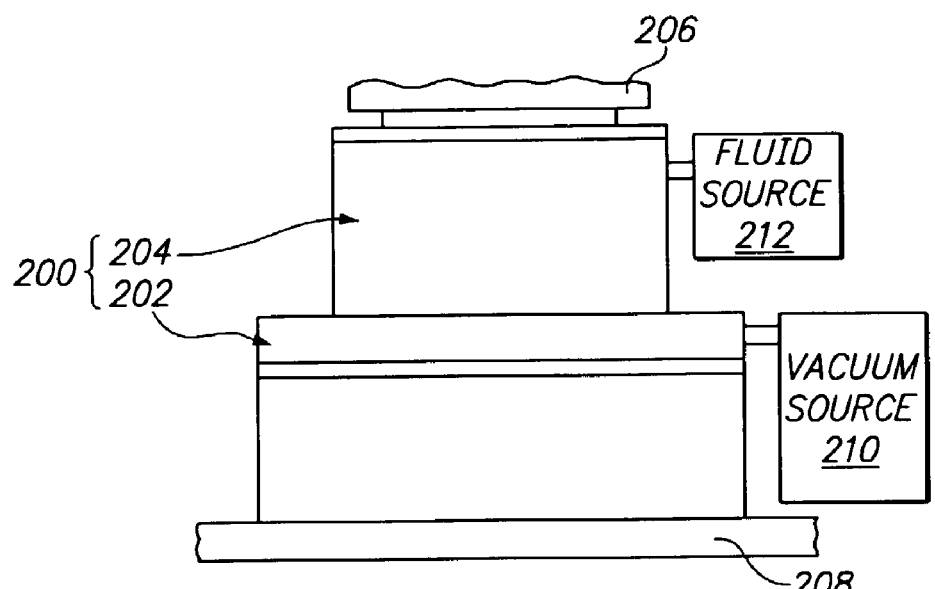
FIG. 2A is a side view of a first embodiment of a vibration isolator having features of the present invention.

FIG. 2A illustrates a side view of a first embodiment of a vibration isolator 200 that can be used in the isolation systems 66, 68, 70, 72 of FIG. 1. In this embodiment, the vibration isolator 200 includes a first system 202 and a second system 204. The first system 202 supports at least a portion of a first assembly 206 relative to a second assembly 208 and the second system 204 adjusts for a change and/or shift in the location of a center of gravity of the first assembly 206. In this embodiment, the first system 202 includes a vacuum source 210 and the second system 204 includes a fluid source 212. The design of the components of the vibration isolator 200 can be varied to suit the intended use of the vibration isolator 200.

Figure 2B:
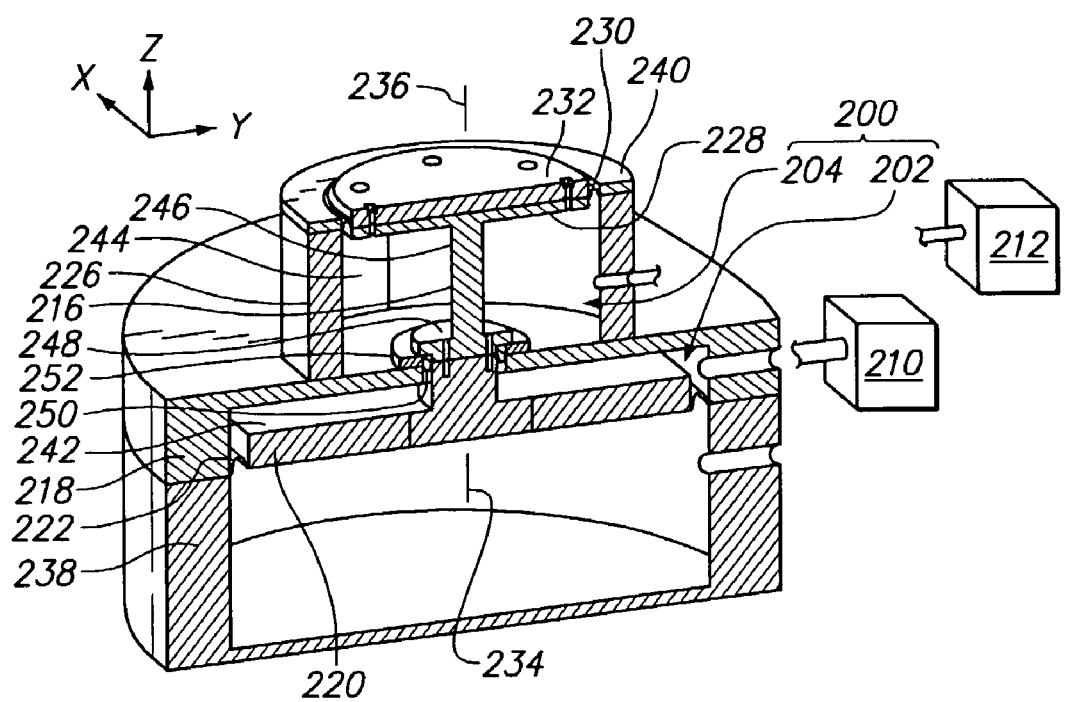
FIG. 2B is a cut-away perspective view of the vibration isolator of FIG. 2A.

FIG. 2B illustrates a cross-sectional, perspective view of the vibration isolator 200 of FIG. 2A. In this embodiment, the vibration isolator 200 includes a system connector 216 that couples the first system 202 to the second system 204 so that the forces from the systems 202, 204 act in parallel. In FIG. 2B, the first system 202 and second system 204 are aligned along the Z axis and the driving force and the supporting force for the first system 202 and second system 204 act along the Z axis.

In this embodiment, (i) the first system 202 includes a first cylinder 218, a first piston 220, a first seal 222, and the vacuum source 210 and (ii) the second system 204 includes a second cylinder 226, a second piston 228, a second seal 230, and the fluid source 212. The first piston 220 moves within the first cylinder 218 along a first axis 234 and the second piston 228 moves within the second cylinder 226 along a second axis 236. Further, the first system 202 is a vacuum type actuator and the second system 204 is a fluid type actuator. Thus, the first system 202 functions differently from the second system 204.

The second system 204 is stacked on top and positioned directly above the first system 202, and the first axis 234 is substantially coaxial with the second axis 236. Further, the system connector 216 mechanically couples and connects the first piston 220 to the second piston 228 so that the pistons 220, 228 move concurrently. With this design, the pistons 220, 226 cooperate to dampen vibration and support the load. Stated another way, each of the pistons 220, 228 is connected to the load.

The size and shape of each of the cylinders 218, 226 can be varied to suit the design requirements of the vibration isolator 200. In this embodiment, each of the cylinders 218, 226 includes a tubular shaped wall. Further, the first cylinder 218 includes a disk shaped top. The wall of each of the cylinders 218, 226 is generally annular shaped. Alternately, for example, the wall could be square tube shaped. It should be noted that in this embodiment, the diameter of the first cylinder 218 is larger than the diameter of the second cylinder 226.

The first piston 220 is sized and shaped to fit within the first cylinder 218 and move within the first cylinder 218. Similarly, the second piston 228 is sized and shaped to fit within the second cylinder 226 and move within the second cylinder 226. In this embodiment, each of the pistons 220, 228 is generally disk shaped and has a generally circular shaped cross section. The diameter of the first piston 220 is larger than the diameter of the second piston 228. This allows the first system 202 to carry the majority of the load and the second system 204 to adjust for shifts in the center of gravity of the first assembly 206, adjust to a changing load, and/or adjust for a change in atmospheric pressure.

The ratio of the diameters is a function of the ratio of the areas. The ratio of areas is a function of the load ratio. The load ratio is a function of area and pressure. The vibration isolator 200 can be designed so that the first system 202 supports approximately 100% of the load at the highest expected barometric pressure and the second system 204 supports approximately 5% (barometric pressure change) plus approximately 2% (center of gravity shift) of the load. For example, a fluid pressure in the second system 204 of approximately 60 psi, then the area ratio would need to be 100:7 and the diameter ratio would be 10:2.65. Alternately, if the fluid pressure in the second system 204 is 5 psi, then the area ratio would be 100:21 and the diameter ratio would be 10:4.58. Suitable ratios may be approximately 10:1 on area and approximately 10:3 on diameter.

The first seal 222 seals the first piston 220 to the first cylinder 218 and allows for motion of the first piston 220 relative to the first cylinder 218. Similarly, the second seal 230 seals the second piston 228 to the second cylinder 226 and allows for motion of the second piston 228 relative to the second cylinder 226. The design of each of the seals 222, 230 can be varied. In FIG. 2B, each of the seals 222, 230, is a convoluted diaphragm made of a resilient material such as rubber. The bottom of the first piston 220 is secured to the top of the first seal 222. Further, the top of the second piston 228 is secured to the bottom of the second seal 230 with a seal cap 232.

The convolution in the first seal 222 rolls up and down to allow the first piston 220 to move relative to the first cylinder 218 without deforming the rest of the first seal 222. Similarly, the convolution in the second seal 230 rolls up and down to allow the second piston 228 to move relative to the second cylinder 226 without deforming the rest of the second seal 230. Alternately, other types of seals can be utilized that allow for greater lateral flexibility. For example, ferro fluidic seals and/or air/vacuum bearing seals can be utilized.

A first clamp 238 secures and seals the first seal 222 to the first cylinder 218. Similarly, a second clamp 240 secures and seals the second seal 230 to the second cylinder 226. In this embodiment, (i) the first clamp 238 includes an annular shaped ring and a disk shaped bottom and the (ii) the second clamp 240 is an annular shaped ring. The first clamp 238 is secured to the bottom of the first cylinder 218 with an outer perimeter of the first seal 222 positioned between the first clamp 238 and the first cylinder 218. The first clamp 238 includes an aperture so that the pressure below the first piston 220 is equal to the atmospheric pressure. Somewhat similarly, the second clamp 240 is secured to the top of the second cylinder 226 with an outer perimeter of the second seal 230 positioned between the second clamp 240 and the second cylinder 226.

The first piston 220 cooperates with the first cylinder 218 and the first seal 222 to define a first chamber 242 above the first piston 220. Somewhat similarly, the second piston 228 cooperates with the second cylinder 226 and the second seal 230 to define a second chamber 244 below the second piston 228. The size and shape of each of the chambers 242, 244 varies according to the design of the rest of the components of the vibration isolator 200.

The design of the vacuum source 210 and the fluid source 212 can be varied. The vacuum source 210 is in fluid communication with the first chamber 242 and the fluid source 212 is in fluid communication with the second chamber 244. The vacuum source 210 can be a vacuum pump and the fluid source 212 can be a fluid pump or a compressor. In one embodiment, the fluid supplied by the fluid source 212 is a compressible gas.

The control system 28 (illustrated in FIG. 1) actively controls the vacuum source 210 to control the pressure in the first chamber 242 and the fluid source 212 to control the pressure in the second chamber 244. More specifically, in this embodiment, the control system 28 controls the vacuum source 210 to remove fluid from the first chamber 242 so that a first chamber pressure above the first piston 220 is less than the atmospheric pressure below the first piston 220. The amount of differential between the first chamber pressure and the atmospheric pressure can be varied. Typically, atmospheric pressure is approximately 14.7 psi. With this design, the pressure differential is less than approximately 14.7 psi and typically between approximately 14.65 psi and 14.68 psi.

Somewhat similarly, the control system 28 actively controls the fluid source 212 to add fluid from the second chamber 244 so that a second chamber pressure in the second chamber 244, below the second piston 228 is greater than the atmospheric pressure above the second piston 228. The amount of differential between the second chamber pressure and the atmospheric pressure can be varied. The pressure differential is typically between approximately 0 psi and 60 psi.

Stated another way, the control system 28 actively controls and adjusts the pressure in each of the chambers 242, 244. With this design, the control system 28 can easily adjust the force characteristics and the height of the vibration isolator 200. It should be noted that the first system 202 can be designed to carry the majority of the load. For example, the first system 202 can carry at least approximately 70% or at least approximately 80%, or at least approximately 95%, or at least approximately 100% of the load. Alternately, the second system 204 can carry only approximately 30%, or approximately only 20%, or approximately only 5%, or approximately 0% of the load. Further, the second system 204 is used to adjust for shifts in a center of gravity of the first assembly 206 or a change in atmospheric pressure.

Further, it should be noted that the vacuum type first system 202 is not very stiff and has a relatively low natural frequency when compared to a typical air type actuator having a comparable load capabilities. Stiffness for a volume of gas can be determined using the equation $K = G*P*A/H_{eff}$, where G is the ratio of specific heats (approximately 1.4 for air), P is the absolute pressure, A is the piston area, $H_{eff}$ is the effective height, and $H_{eff}=V/A$, where V is the volume of chamber. For example, if P is equal to 60 psig (500e3 Pa abs), A is equal to 0.125 m², $H_{eff}$ is equal to 0.150 m and $K_{air}$ is equal to 583e3$^N$/m or 583$^N$/m, and the load is equal to (P-100$_e$3)*A=50e3N. For a vacuum piston carrying the same load, A=0.5 m2, P=345 Pa (0.05 psi abs.), $H_{eff}$=0.150 m and because $K=GP_a/H_{eff}$ there is nearly zero pressure in the vacuum chamber, $K_{vac}$=1.6e3$^N$/m or 1.6$^N$/mm. Thus, a vacuum type isolator is approximately 360 times less stiff than the air type actuator. This difference can increase if the vacuum pressure decreases. For example, if a high vacuum pump is used, then P=0.3 Pa (0.00005 PSI) and the stiffness ratio would be 360,000:1. These comparisons do not include any stiffness from the seals, which can be anywhere between 4 and 12$^N$/m. If a seal stiffness of 12$^N$/m was included in the above example, then $K_{air}$=583+12=595$^N$/mm and $K_{vac}$=1.6+12=12.6$^N$/mm. Then the vacuum system would be approximately 47 times less stiff than the air system. The natural frequencies of the systems would be, $f=^1/2TN*(^K/m)^{0.5}$ and $f_{air}$=1.73 $H_z$ and $f_{vac}$=0.25$H_z$=1.73/(47)$^{0.5}$.

For the embodiment illustrated in FIGS. 2A–2D, the first system 202 is much larger and carries significantly more of the load than the second system 204. As provided herein, the first system 202 can be at least approximately 2.5 times less stiff, or at least approximately 50 times less stiff, or at least approximately 100 times less stiff, or at least approximately 200 times less stiff than the second system 204. Thus, the resulting vibration isolator 200 has characteristics that are similar to the first system 202.

The system connector 216 mechanically and rigidly connects the first piston 220 to the second piston 228. As a result thereof, the first piston 220 and the second piston 228 move concurrently and are connected together to the load. The design of the system connector 216 can be varied to suit the design requirements of the vibration isolator 200. In this embodiment, the system connector 216 extends from the top of the first piston 220 to the bottom of the second piston 228 through the chambers 242, 244 along the axes 234, 236. In this embodiment, some of the components of the system connector 216 are formed as part of the pistons 220, 228. More specifically, referring to FIG. 2B, the system connector 216 includes (i) a rigid, connector shaft 246 that extends and cantilevers downward from the second piston 228 along the axes 234, 236 to the first piston 220, (ii) a shaft attacher 248, e.g. a plurality of bolts, that secure the bottom of the connector shaft 246 to the first piston 220, and (iii) a connector seal 250 that allows the shaft attacher 248 to extend through the chambers 242, 244 while sealing the first chamber 242 from the second chamber 244. The connector seal 250 can be a convoluted diaphram and can include an annular convolution that allows the pistons 220, 228 and the connector shaft 246 to move without deforming the rest of the first connector seal 250. A connector clamp 252 seals an outer perimeter of the connector seal 250 to the top of the first cylinder 218 and an inner perimeter of the connector seal 250 is sealed to the connector shaft 246.

Figure 2D:
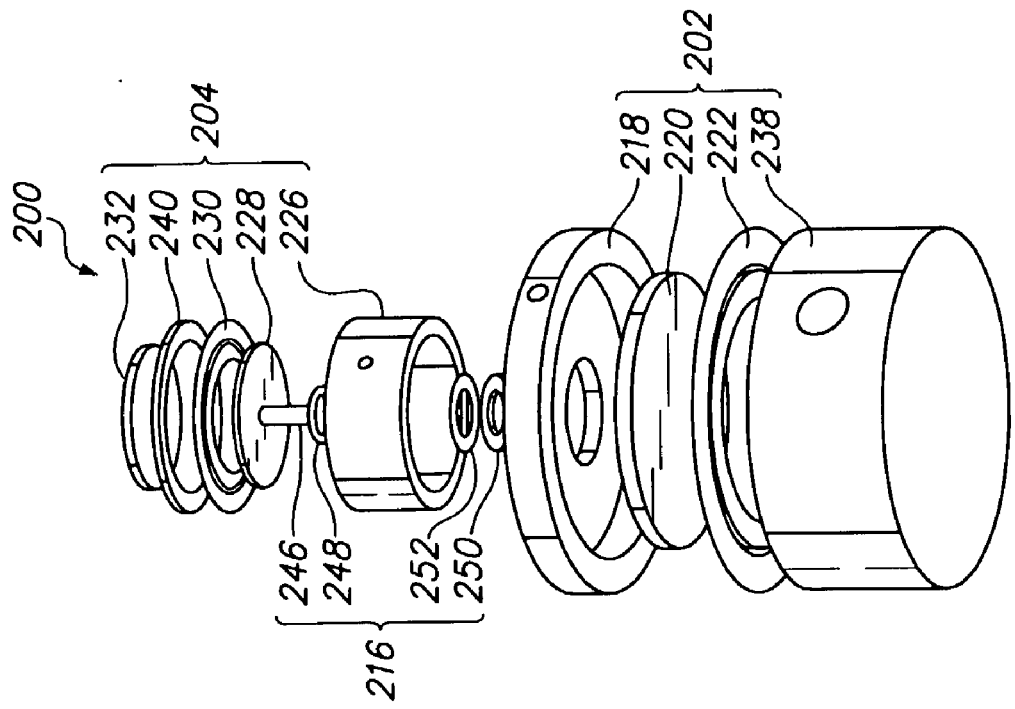
FIG. 2D is a bottom, exploded perspective view of a portion of the vibration isolator of FIG. 2A.
Figure 2C:
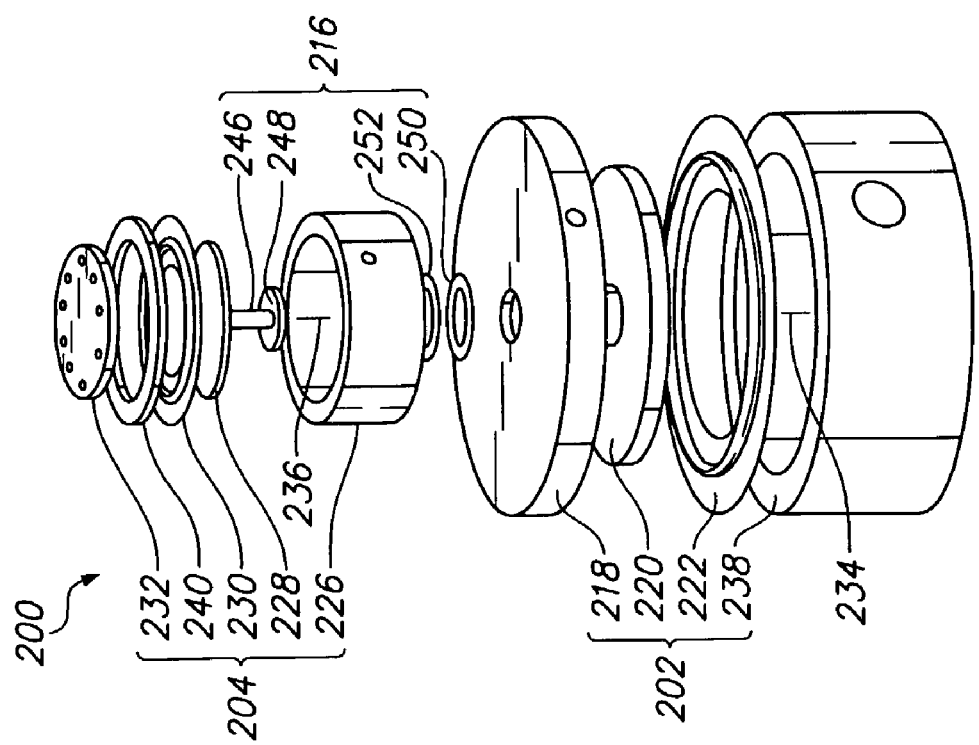
FIG. 2C is a top, exploded perspective view of a portion of the vibration isolator of FIG. 2A.

FIGS. 2C and 2D each illustrate exploded perspective views of the vibration isolator 200, including (i) the first system 202 having the first cylinder 218, the first piston 220, the first seal 222, the first clamp 238, and the first axis 234, (ii) the second system 204 having the second cylinder 226, the second piston 228, the second seal 230, the second clamp 240, the seal cap 232, and the second axis 236, and (iii) the system connector 216 including the connector shaft 246, the shaft attacher 248, the connector seal 250, and the connector clamp 252.

Figure 3A:
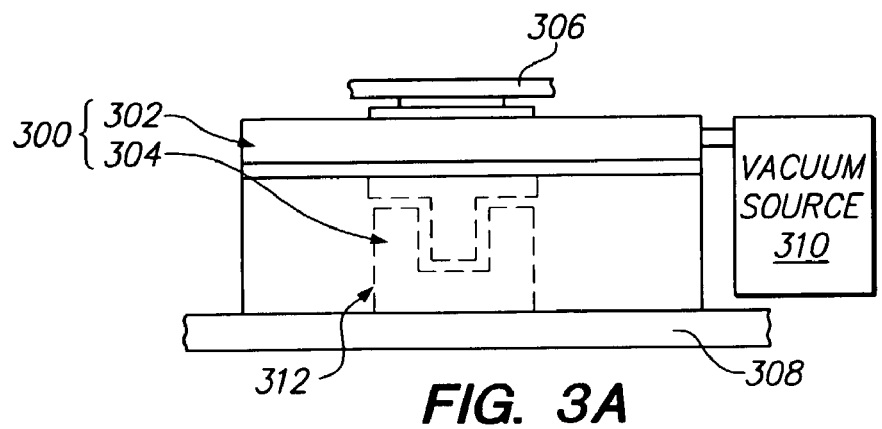
FIG. 3A is a side view of another embodiment of a vibration isolator having features of the present invention.

FIG. 3A illustrates a side view of another embodiment of a vibration isolator 300 that can be used in the isolation systems 66, 68, 70, 72 of FIG. 1. In this embodiment, the vibration isolator 300 includes a first system 302 and a second system 304 (illustrated in phantom). The first system 302 supports at least a portion of a first assembly 306 relative to a second assembly 308 and the second system 304 adjusts for a change and/or shift in the location of a center of gravity of the first assembly 306 and/or a change in the atmospheric pressure near the isolator 300. In this embodiment, the first system 302 is a vacuum type actuator that includes a vacuum source 310 and the second system 304 includes a mover assembly 312. Thus, the first system 302 functions differently from the second system 304. The design of the components of the vibration isolator 300 can be varied to suit the intended use of the vibration isolator 300.

Figure 3B:
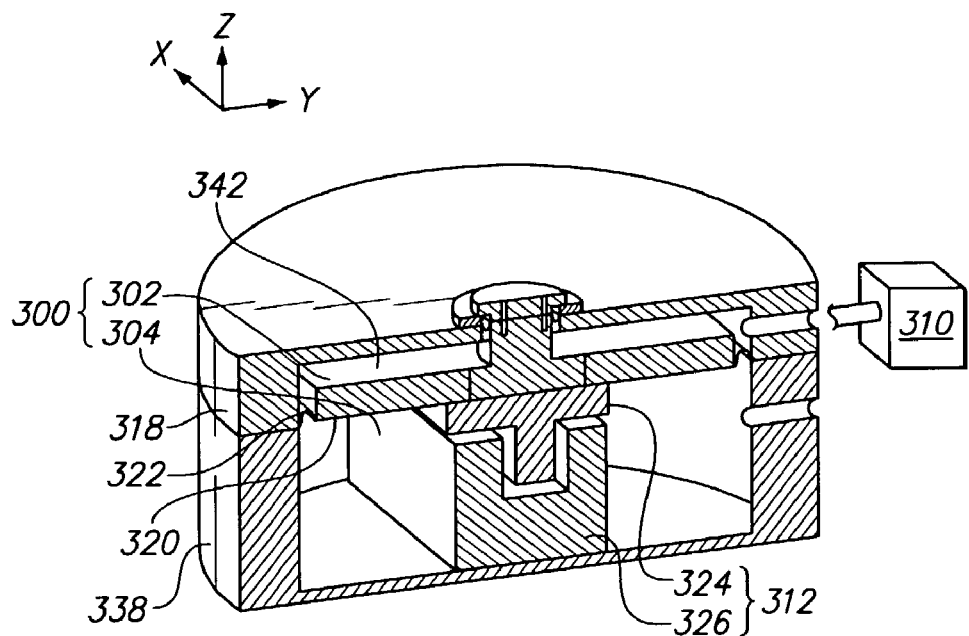
FIG. 3B is a cut-away perspective view of the vibration isolator of FIG. 3A.

FIG. 3B illustrates a cross-sectional, perspective view of the vibration isolator 300 of FIG. 3A. In this embodiment, the second system 304 is positioned below the first system 302. Further, the second system 304 is directly coupled to the first system 302 so that the systems 302, 304 act in parallel and move concurrently. In FIG. 3B, the first system 302 and second system 304 are aligned along the Z axis and the driving force and the supporting force for the first system 302 and second system 304 act along the Z axis.

In this embodiment, the first system 302 includes a first cylinder 318, a first piston 320, a first seal 322, a first clamp 338 and the vacuum source 310 that are similar to the corresponding components described above and illustrated in FIGS. 2A–2D.

In FIG. 3B, the second system 304 includes the mover assembly 312 that is coupled to the first piston 320 and moves the first piston 320 relative to the second assembly 308 along the Z axis. The design of the mover assembly 312 can be varied. For example, the mover assembly 312 can include one or more rotary motors, voice coil motors, linear motors, electromagnetic actuators, or some other force actuators. In FIG. 3B, the mover assembly 312 is a non-commutated, linear motor, commonly referred to as a voice coil motor. The mover includes (i) a first component 324 that is secured to the first piston 320 and (ii) an adjacent second component 326 that interacts with the first component 324, the second component 326 is secured and coupled to the first cylinder 318 via the bottom of the first clamp 338.

For the mover, one of the components 324, 326 includes one or more magnets and the other component 324, 326 includes one or more conductors. In this embodiment, the first component 324 includes a conductor array, while the second component 326 includes a pair of spaced apart magnet arrays. Alternately, for example, the first component could include one or more magnet arrays while the second component could include one or more conductor arrays.

Electrical current (not shown) is supplied to the conductor array by the control system 28 (illustrated in FIG. 1). The electrical current interacts with a magnetic field (not shown) generated by one or more of the magnets. This causes a force (Lorentz force) between the conductor and the magnets. The required stroke of the mover can vary. It is anticipated that the required stroke of the mover is between approximately 5 mm and 15 mm. However, larger or smaller strokes can be utilized.

Further, the control system 28 actively controls the vacuum source 310 to remove fluid from a first chamber 342 so that the first chamber pressure is below the atmospheric pressure. With this design, the control system 28 can easily adjust the damping characteristics, the force characteristics, and the height of the vibration isolator 300. It should be noted that the first system 302 is again designed to carry the majority of the load of the first assembly 306.

It should be noted that a fluid actuator similar to the second system 204 illustrated in FIGS. 2A–2D can be coupled to the isolator 300 illustrated in FIGS. 3A and 3B.

Figure 4A:
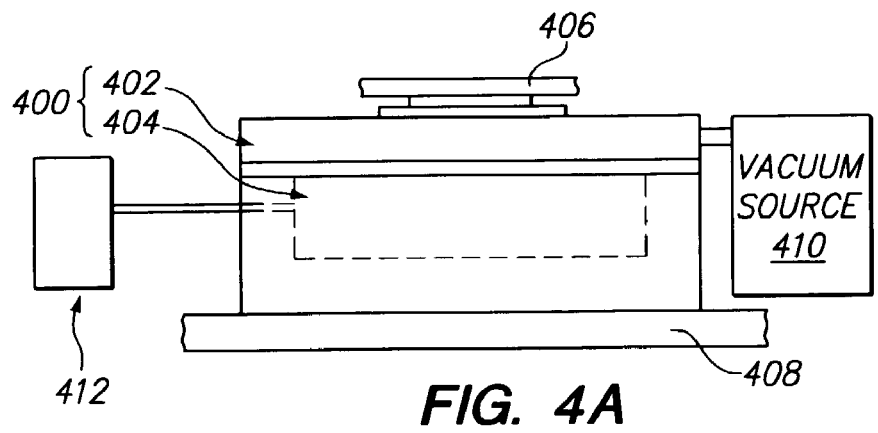
FIG. 4A is a side view of still another embodiment of a vibration isolator having features of the present invention.

FIG. 4A illustrates a side view of another embodiment of a vibration isolator 400 that can be used in the isolation systems 66, 68, 70, 72 of FIG. 1. In this embodiment, the vibration isolator 400 includes a first system 402 and a second system 404 (illustrated in phantom). The first system 402 supports a first assembly 406 relative to a second assembly 408 and the second system 404 adjusts for a change and/or shift in the location of a center of gravity of the first assembly 406 and/or a change in the atmospheric pressure near the isolator 400. In this embodiment, the first system 402 is a vacuum actuator that includes a vacuum source 410 and the second system 404 includes a mass adjuster 412. Thus, the first system 402 functions differently from the second system 404. The design of the components of the vibration isolator 400 can be varied to suit the intended use of the vibration isolator 400.

Figure 4B:
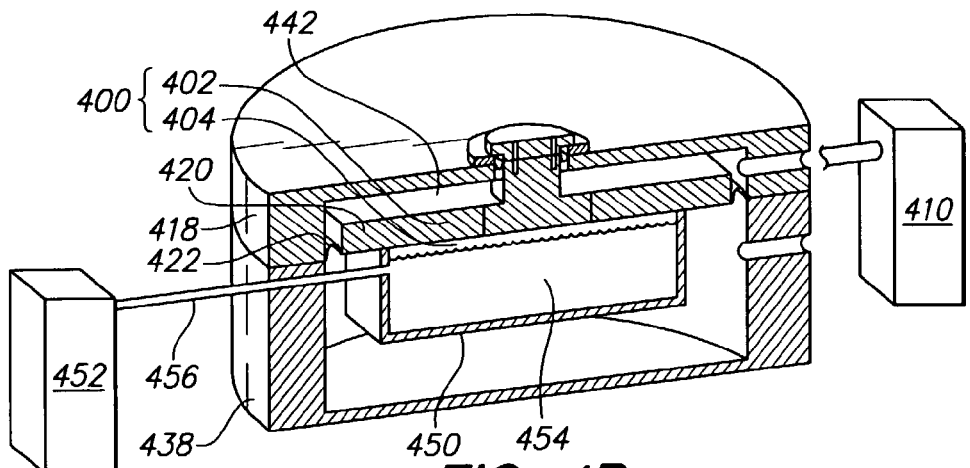
FIG. 4B is a cut-away perspective view of the vibration isolator of FIG. 4A.

FIG. 4B illustrates a cross-sectional, perspective view of the vibration isolator 400 of FIG. 4A. In this embodiment, the second system 404 is positioned below the first system 402. Further, the second system 404 is directly coupled to the first system 402 so that the systems 402, 404 move concurrently.

In this embodiment, the first system 402 includes a first cylinder 418, a first piston 420, a first seal 422, a first clamp 438, and the vacuum source 410 that are similar to the corresponding components described above and illustrated in FIGS. 2A–2D.

The mass adjuster 412 is designed to change, e.g. add or remove, the mass that is carried by the first system 402. The design of the mass adjuster 412 can be varied. In FIG. 4B, the mass adjuster 412 includes a reservoir 450 that is coupled and secured to the first piston 420 and a fluid source 452. The reservoir 450 receives a fluid 454. The fluid source 452 is in fluid communication with the reservoir 450 with a source tube 456. The fluid source 452 adds or removes fluid 454 from the reservoir 450 to adjust the mass of that is coupled to the first piston 420. The fluid source 452, for example, can include one or more pumps. With this design, the mass adjuster 412 can compensate for changes in the atmospheric pressure and/or a shift is the center of gravity of the first assembly 406. Suitable fluids 454 include high-density fluids such as water or mercury.

The control system 28 (illustrated in FIG. 1) actively controls the fluid source 452 to add fluid 454 to the reservoir 450 or remove fluid 454 from the reservoir 450 to adjust the mass that is coupled to the first piston 420. Further, the control system 28 actively controls the vacuum source 410 to remove fluid from a first chamber 442 so that the first chamber pressure below the atmospheric pressure. With this design, the control system 28 can easily adjust the damping characteristics and the height of the vibration isolator 400. It should be noted in this embodiment, the first system 402 is designed to carry the entire load of the first assembly 406.

Further, a fluid actuator similar to the second system 204 illustrated in FIGS. 2A–2D and/or a mover assembly 312 as illustrated in FIGS. 3A and 3B can be coupled to the isolator 400 illustrated in FIGS. 4A and 4B.

Figure 5F:
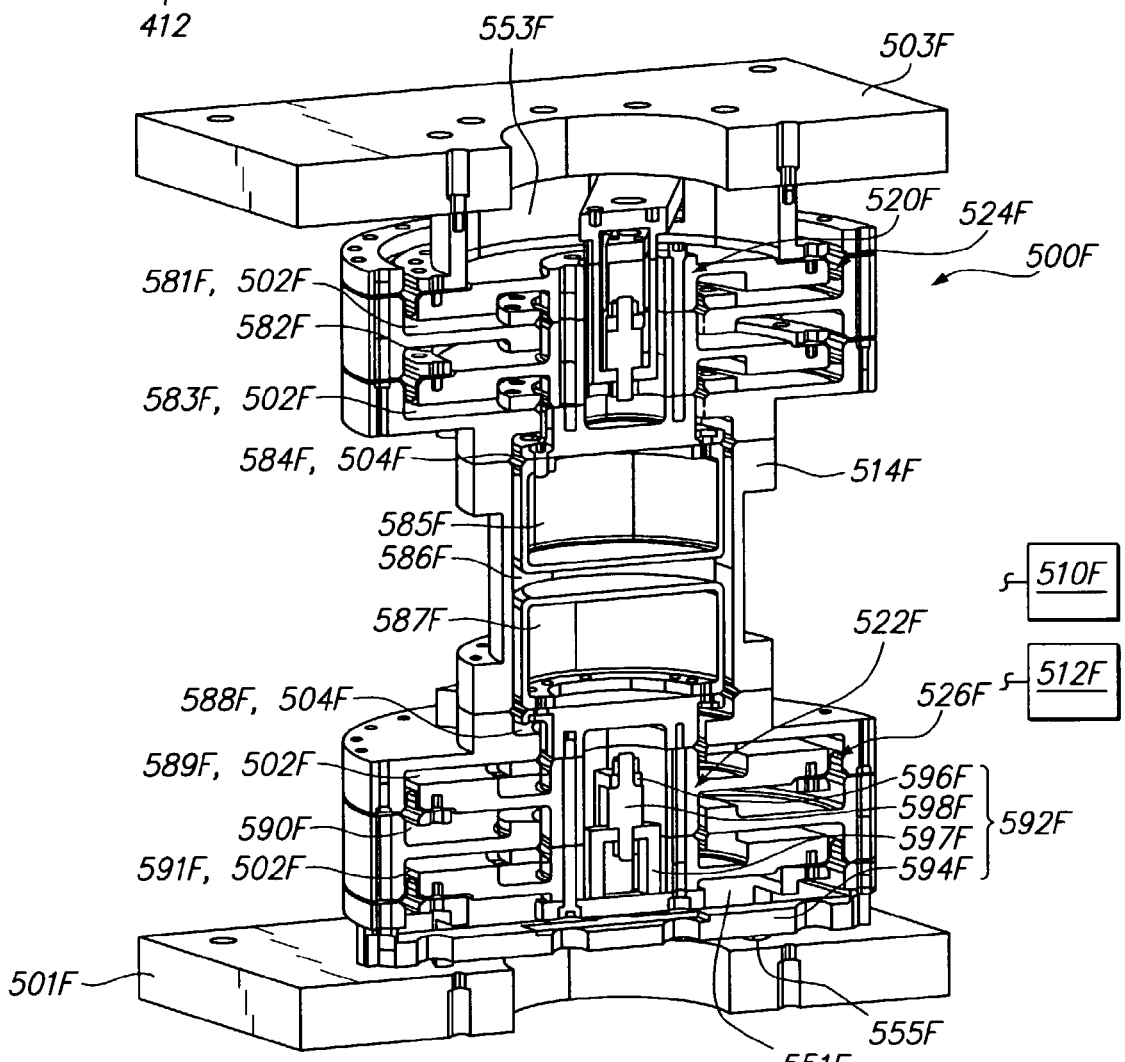
FIG. 5F is a cross-section view of yet another embodiment of a vibration isolator.
Figure 5A:
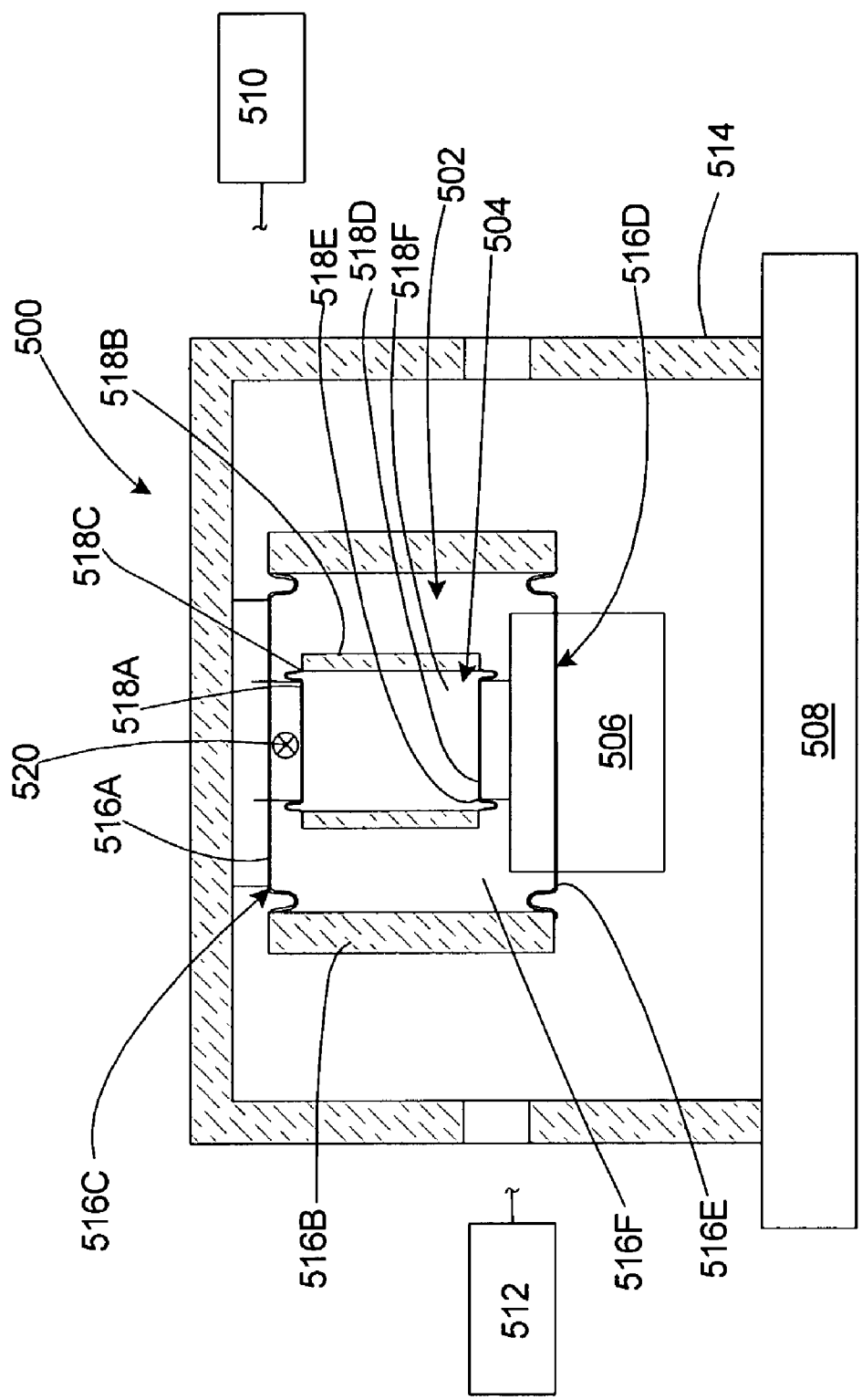
FIG. 5A is a cut-away view of yet another embodiment of a vibration isolator having features of the present invention.

FIG. 5A illustrates a side cut-away view of another embodiment of a vibration isolator 500 that can be used in the isolation systems 66, 68, 70, 72 of FIG. 1. In this embodiment, the vibration isolator 500 includes a first system 502 and a second system 504. The first system 502 supports at least a portion of a first assembly 506 relative to a second assembly 508 and the second system 504 adjusts for a change and/or shift in the load caused by, for example, a change in the location of a center of gravity of the first assembly 506 and/or a change in atmospheric pressure near the isolator 500. In this embodiment, the first system 502 is a vacuum type actuator that includes a vacuum source 510 and the second system 504 is a fluid type actuator that includes a fluid source 512. Thus, the first system 502 functions differently from the second system 504. The design of the components of the vibration isolator 500 can be varied to suit the intended use of the vibration isolator 500.

In this embodiment, a vibration frame 514 secures an upper end of the first system 502 and the second system 504 to the second assembly 508, and the first assembly 506 is secured to the lower end of the first system 502 and the second system 504. Moreover in this embodiment, (i) the first system 502 includes a disk shaped attachment flange 516A, a tubular sleeve 516B, an annular shaped flange seal 516C, a disk shaped first piston 516D, and a first piston seal 516E that cooperate to form a first chamber 516F, and (ii) the second system 504 includes a disk shaped attachment flange 518A, a tubular sleeve 518B, an annular shaped flange seal 518C, a disk shaped second piston 518D, and a second piston seal 518E that cooperate to form a second chamber 518F. The vacuum source 510 maintains the first chamber 516F below atmospheric pressure and the fluid source 512 maintains the pressure in the second chamber 518F above the pressure in the first chamber 516F.

It should be noted in this embodiment, the first system 502 and the second system 504 act as a pendulum assembly that allows the vibration isolator 500 to have reduced lateral stiffness. More specifically, (i) for the first system 502, the sleeve 516B pivots relative to the flange seal 516C, and (ii) for the second system 504, the sleeve 518B pivots relative to the flange seal 518C. With this design, the vibration isolator 500 allows the first assembly 506 to move laterally relative to the second assembly 508. In this embodiment, the central axis of the seals 516C, 518C define an axis of motion 520 about which the sleeves 516B, 518B pivot. The axis of motion 520 is located approximately between the seals 516C, 518C. Similarly, the seals 516C, 518C allow the sleeves 516B, 518B to pivot relative to the first assembly 506.

Figure 5B:
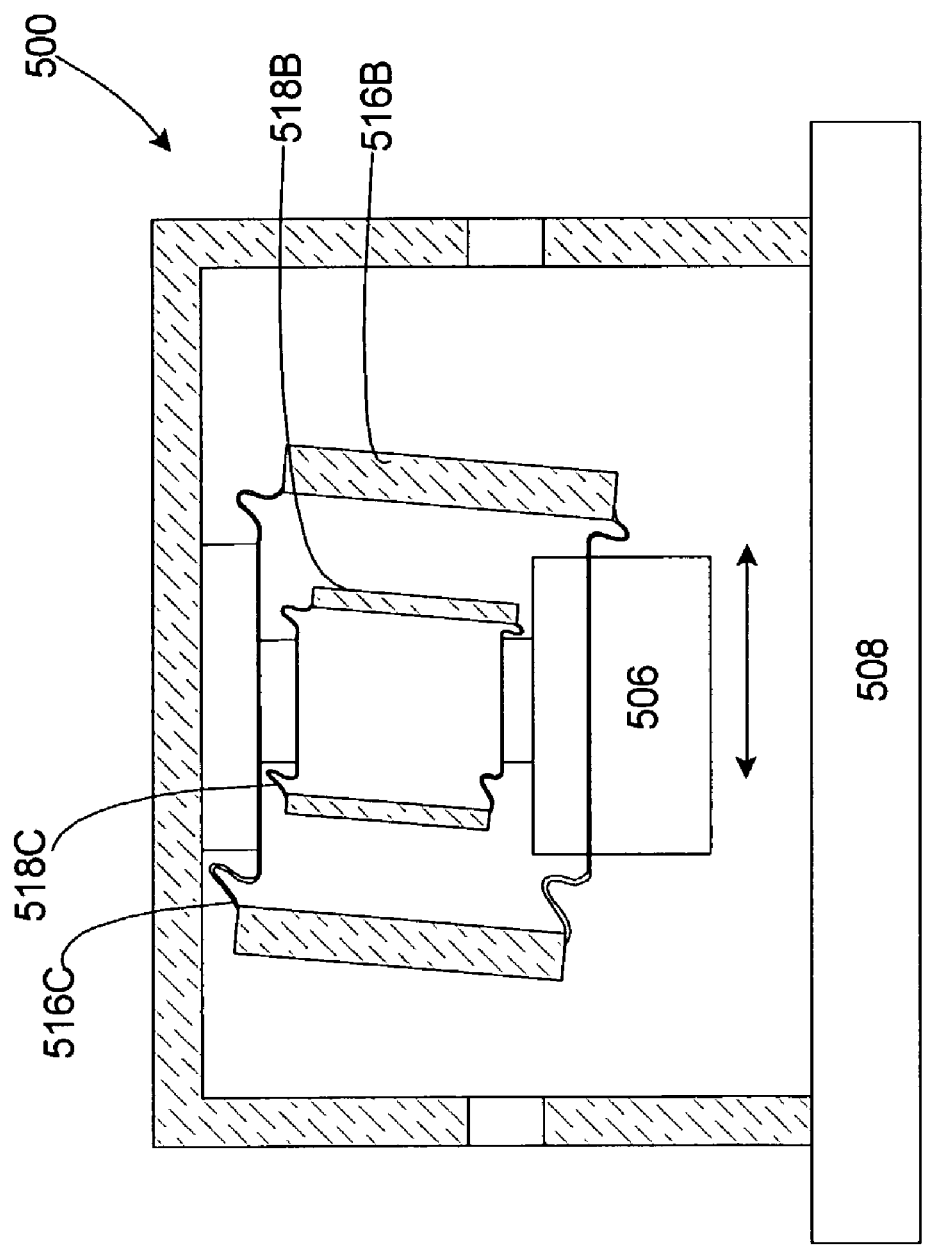
FIG. 5B is a cut-away of the embodiment of the vibration isolator of FIG. 5A illustrating lateral movement.

FIG. 5B is a simplified illustration of the vibration isolator 500 of FIG. 5A. FIG. 5B illustrates that the vibration isolator 500 allows the first assembly 506 to move laterally relative to the second assembly 508. More specifically, the sleeves 516B, 518B pivot relative to the seals 516C, 518C.

Figure 5C:
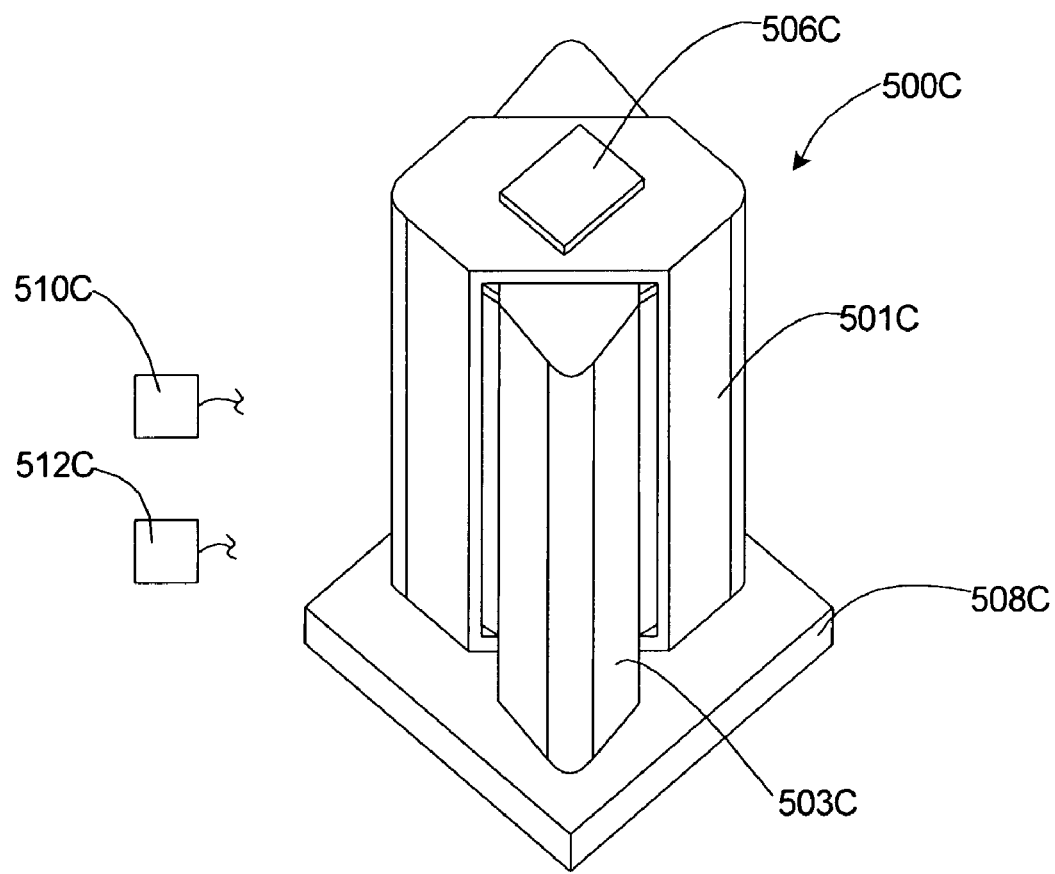
FIG. 5C is a perspective view of still another embodiment of a vibration isolator.
Figure 5D:
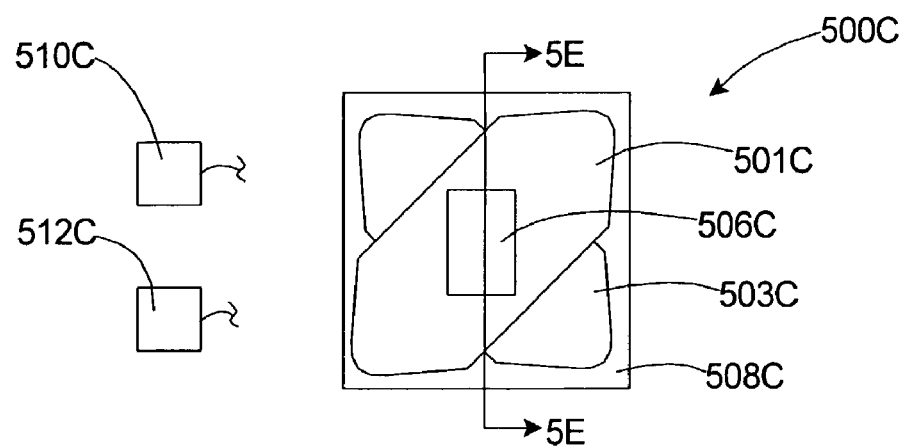
FIG. 5D is a top view of the vibration isolator of FIG. 5C.

FIG. 5C illustrates a perspective view and FIG. 5D illustrates a top view of how a pendulum type isolator can be implemented. In this embodiment, the vibration isolator 500C includes a first frame 501C that is secured to the first assembly 506C, a second frame 503C that is secured to the second assembly 508C, a vacuum source 510C and a fluid source 512C. In this embodiment, the first frame 501C is rigid and generally rectangular frame shaped and the second frame 503C is rigid and generally rectangular frame shaped.

Figure 5E:
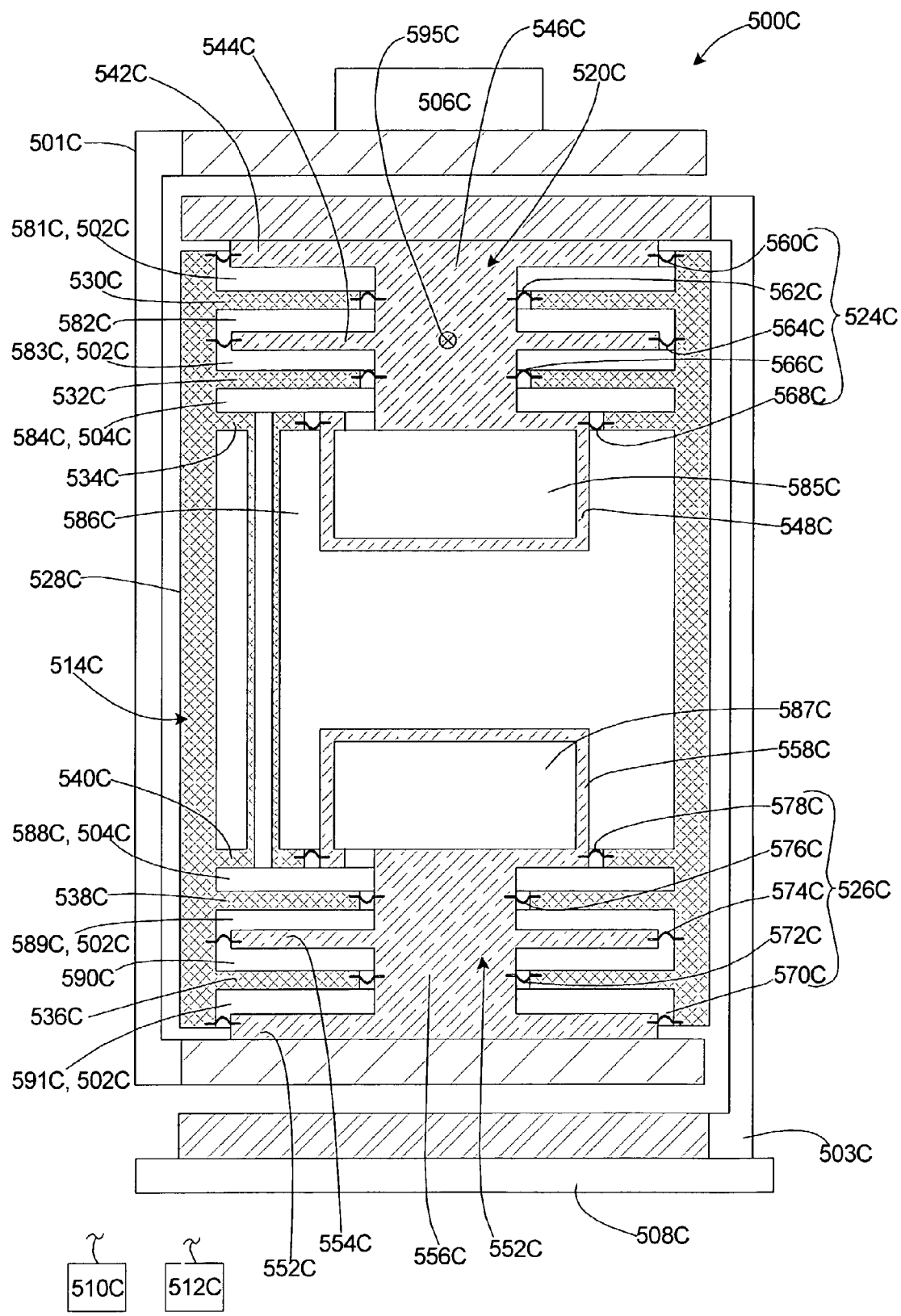
FIG. 5E is a cut-away view taken on line 5E-5E of FIG. 5D.

FIG. 5E illustrates a cut-away view of the vibration isolator 500C of FIGS. 5C and 5D. In this embodiment, the vibration isolator 500C includes four, vacuum type first systems 502C, and two, fluid type second systems 504C. More specifically, the vibration isolator 500C includes the first frame 501C, the second frame 503C, a sleeve 514C, an upper piston assembly 520C, a lower piston assembly 522C, an upper seal assembly 524C, and a lower seal assembly 526C. With this design, the sleeve 514C pivots relative to the upper piston assembly 520C and allows the first assembly 506C to move laterally relative to the second assembly 508C. With this design, a vibration isolator 500C having a relatively small footprint will have a relatively large capacity. It should be noted that in this design, at least a portion of one of the systems 502C, 504C pivot relative to another systems 502C, 504C.

In this embodiment, the first frame 501C is rigid, extends between the first assembly 506C and the lower piston assembly 522C and couples the lower piston assembly 522C to the first assembly 506C. Somewhat similarly, the second frame 503C is rigid, extends between the second assembly 508C and the upper piston assembly 520C, and couples the upper piston assembly 520C to the second assembly 508C.

The sleeve 514C is rigid, and includes a generally tubular shaped section 528C and a plurality of annular shaped, spaced apart walls, such as (i) an annular disk shaped, first upper wall 530C that is positioned near a top of the sleeve 514C, (ii) an annular disk shaped, second upper wall 532C that is positioned below the first upper wall 530C, (iii) an annular disk shaped, third upper wall 534C that is positioned below the second upper wall 532C, (iv) an annular disk shaped, first lower wall 536C that is positioned near a bottom of the sleeve 514C, (v) an annular disk shaped, second lower wall 538C that is positioned above the first lower wall 536C, (vi) an annular disk shaped, third lower wall 540C that is positioned above the second lower wall 538C.

The upper piston 520C assembly is rigid and includes (i) a disk shaped, first upper piston 542C that is positioned near the top of the upper piston assembly 520C, (ii) a disk shaped, second upper piston 544C that is positioned below the first upper piston 542C, (iii) a cylindrical shaped, upper piston connector 546C that connects the upper pistons 542C, 544C together, and (iv) a cylindrical shaped upper container 548C that is secured to the bottom of the upper piston connector 546C. The first upper piston 542C is fixedly secured to a top beam of the second frame 503C.

The lower piston assembly 522C is rigid and includes (i) a disk shaped, first lower piston 552C that is positioned near the bottom of the lower piston assembly 522C, (ii) a disk shaped, second lower piston 554C that is positioned above the first lower piston 552C, (iii) a cylindrical shaped, lower piston connector 556C that connects the lower pistons together 552C, 554C, and (iv) a cylindrical shaped lower container 558C that is secured to the top of the lower piston connector 556C. The first lower piston 552 is fixedly secured to the bottom beam of the first frame 501C.

The upper seal assembly 524C secures and seals the upper piston assembly 520C to the sleeve 514C and allows the sleeve 514C and the lower piston assembly 522C to pivot relative to the upper piston assembly 520C and the second assembly 508C. In FIG. 5E, the upper seal assembly 524C includes (i) a first upper seal 560C that secures and seals the first upper piston 542C to the sleeve 514C, (ii) a first upper intermediate seal 562C that secures and seals the first upper wall 530C to the upper piston connector 546C intermediate the upper pistons 542C, 544C, (iii) a second upper seal 564C that secures and seals the second upper piston 544C to the sleeve 514C, (iv) a second upper intermediate seal 566C that secures and seals the second upper wall 532C to the upper piston connector 546C below the second upper piston 544C, and (v) a third upper seal 568C that secures and seals the upper container 548C to the upper third wall 534C.

Somewhat similarly, the lower seal assembly 526C secures and seals the lower piston assembly 522C to the sleeve 514C. In FIG. 5E, the lower seal assembly 526C includes (i) a first lower seal 570C that secures and seals the first lower piston 552C to the sleeve 514C, (ii) a first lower intermediate seal 572C that secures and seals the first lower wall 536C to the lower piston connector 556C intermediate the lower pistons 552C, 554C, (iii) a second lower seal 574C that secures and seals the second lower piston 554C to the sleeve 514C, (iv) a second lower intermediate seal 576C that secures and seals the second lower wall 538C to the lower piston connector 556C above the second lower piston 554C, and (v) a third lower seal 578C that secures and seals the lower container 558C to the lower third wall 540C.

In FIG. 5E, each seal is a convoluted diaphram seal that includes an annular convolution that allows the sleeve 514C and the rest of the pendulum assembly to move with relatively moderate lateral resistance. Stated another way, this type of seal allows for lateral movement with minimal resistance. Alternately, other types of seals can be utilized that allow for greater lateral flexibility. For example, ferro fluidic seals and/or air/vacuum bearing seals can be utilized.

The components cooperate so that the vibration isolator 500C includes eleven separate chambers. More specifically, moving top to bottom, the vibration isolator 500C includes (i) a first chamber 581C located between the first upper piston 542C and the first upper wall 530C, (ii) a second chamber 582C located between the first upper wall 530C and the second upper piston 544C, (iii) a third chamber 583C located between the second upper piston 544C and the second upper wall 532C, (iv) a fourth chamber 584C located between the second upper wall 532C and the third upper wall 534C, (v) a fifth chamber 585C formed by the upper container 548C, (vi) a sixth chamber 586C located between the third upper wall 534C and the third lower wall 540C, (vii) a seventh chamber 587C formed by the lower container 558C, (viii) an eighth chamber 588C located between the third lower wall 540C and the second lower wall 538C, (ix) a ninth chamber 589C located between the second lower wall 538C and the second lower piston 554C, (x) a tenth chamber 590C located between the second lower piston 554C and the first lower wall 536C, and (xi) an eleventh chamber 591C located between the first lower wall 536C and the first lower piston 552C.

Of the eleven chambers, some of the chambers are maintained below atmospheric pressure with the vacuum source 510C, some of the chambers are at atmospheric pressure and/or some of chambers are above atmospheric pressure using the fluid source 512C. In FIG. 5E, the first chamber 581C, the third chamber 583C, the sixth chamber 586C, the ninth chamber 589C, and the eleventh chamber 591C are in fluid communication with the vacuum source 510C and are subjected to a vacuum. Further, the second chamber 582C and the tenth chamber 590C are at atmospheric pressure. Moreover, the fourth chamber 584C, the fifth chamber 585C, the seventh chamber 587C and the eighth chamber 588C are in fluid communication with the fluid source 512C and are at pressure above atmospheric pressure.

One or more of the first chamber 581C, the third chamber 583C, the sixth chamber 586C, the ninth chamber 589C, and the eleventh chamber 591C can be in fluid communication with the same vacuum source 510C. Alternately, one or more of these chambers can have a separate vacuum source. This design would allow for the individual control of the pressure in one or more of the first chamber 581C, the third chamber 583C, the sixth chamber 586C, the ninth chamber 589C, and the eleventh chamber 591C.

Somewhat similarly, one or more of the fourth chamber 584C, the fifth chamber 585C, the seventh chamber 587C and the eighth chamber 588C can be in fluid communication with the same fluid source 512C. For example, FIG. 5E illustrates that the fourth chamber 584C, the fifth chamber 585C, the seventh chamber 587C and the eighth chamber 588C are all in fluid communication with each other. Alternately, (i) the fourth chamber 584C and fifth chamber 585C can have a separate fluid source and/or be at a different pressure than the seventh chamber 587C and the eighth chamber 588C. This design would allow for the individual control of the pressure in the fourth chamber 584C and the eighth chamber.

The control system 28 (illustrated in FIG. 1) actively controls (i) the vacuum source 510C to control the pressure in the first chamber 581C, the third chamber 583C, the sixth chamber 586C, the ninth chamber 589C, and the eleventh chamber 591C, and (ii) the fluid source 512C to control the pressure in the fourth chamber 584C, the fifth chamber 585C, the seventh chamber 587C and the eighth chamber 588C. With this design, the control system 28 can easily adjust the force characteristics and the height of the vibration isolator 500. It should be noted that the first systems 502C can be designed to carry the majority of the load. For example, the first systems 502 can carry at least approximately 70% or at least approximately 80%, or at least approximately 95%, or at least approximately 100% of the load. Alternately, the second systems 504C can carry only approximately 30%, or approximately only 20%, or approximately only 5%, or approximately 0% of the load. Further, the second systems 504C ARE used to adjust for changes in load caused by shifts in a center of gravity of the first assembly 506C or a change in atmospheric pressure.

It should be noted in this embodiment, the first systems 502C and the second systems 504C act as a pendulum assembly that allows the vibration isolator 500C to have reduced lateral stiffness. With this design, the vibration isolator 502C allows the first assembly 506C to move laterally relative to the second assembly 508C. In FIG. 5E, the approximate center of the upper seal assembly 524C defines an area of motion 595C about which the pendulum assembly pivots.

FIG. 5F is a perspective cut-away view of how an actual version of the vibration isolator of FIGS. 5C–5E may look. In particular, the vibration isolator 500F of FIG. 5F illustrates includes four, vacuum type first systems 502F, and two, fluid type second systems 504F. Further, the vibration isolator includes a fluid source 512F, a vacuum source 510F, a first frame 501F (only partly shown), a second frame 503F (only partly shown), a sleeve 514F, an upper piston assembly 520F, a lower piston assembly 522F, an upper seal assembly 524F, and a lower seal assembly 526F that are similar to the corresponding components described above and illustrated in FIG. 5E. Moreover, the sleeve 514F pivots relative to the upper piston assembly 520F and allows for lateral movement. Additionally, the four, vacuum type first systems 502F, and the two, fluid type second systems 504F are stacked together.

Again in this embodiment, the components cooperate to so that the vibration isolator 500F includes eleven separate chambers, namely (i) a first chamber 581F, (ii) a second chamber 582F, (iii) a third chamber 583F, (iv) a fourth chamber 584F, (v) a fifth chamber 585F, (vi) a sixth chamber 586F, (vii) a seventh chamber 587F, (viii) an eighth chamber 588F, (ix) a ninth chamber 589F, (x) a tenth chamber 590F, and (xi) an eleventh chamber 591F. Further, (i) the first chamber 581F, the third chamber 583F, the sixth chamber 586F, the ninth chamber 589F, and the eleventh chamber 591F are in fluid communication with the vacuum source 510F and are subjected to a vacuum, (ii) the second chamber 582F and the tenth chamber 590F are at atmospheric pressure, and (iii) the fourth chamber 584F, the fifth chamber 585F, the seventh chamber 587F and the eighth chamber 588F are in fluid communication with the fluid source 512F and are at pressure above atmospheric pressure.

The control system 28 (illustrated in FIG. 1) actively controls (i) the vacuum source 510F to control the pressure in the first chamber 581F, the third chamber 583F, the sixth chamber 586F, the ninth chamber 589F, and the eleventh chamber 591F, and (ii) the fluid source 512F to control the pressure in the fourth chamber 584F, the fifth chamber 585F, the seventh chamber 587F and the eighth chamber 588F. With this design, the control system 28 can easily adjust the force characteristics and the height of the vibration isolator 500F.

In FIG. 5F, the vibration isolator 500F also includes a pendulum support assembly 592F that assists in supporting the weight of the sleeve 514F while allowing the lower piston assembly 522F to move relative to the sleeve 514F. In FIG. 5F, the support assembly 592F flexibly connects and couples the sleeve 514F to the lower piston assembly 522F so that the lower piston assembly 522F can support at least a portion of the weight of the sleeve 514F.

In FIG. 5F, the pendulum support assembly 592F includes a lower support bridge 594F, an upper connector bridge 596F, a lower connector bridge 597F and a flexible support 598F. The lower support bridge 594F is a rigid beam that extends across the bottom of the sleeve 514F. The upper connector bridge 596F is rigid and is fixedly secured to the lower support bridge 594F. The upper connector bridge 596F extends into the center of the lower piston assembly 522F. The lower connector bridge 597F is rigid and is fixedly secured to the lower piston assembly 522F. The lower connector bridge 597F also extends into the center of the lower piston assembly 522F. The flexible support 598F is flexible and is secured between the upper connector bridge 596F and the lower connector bridge 597F to flexibly connect the sleeve 514F to the lower piston assembly 522F. The flexible support 598F can be made of a resilient material such as rubber.

It should be noted in this embodiment that the sleeve 514F acts as a pendulum assembly that allows the vibration isolator 500F to have improved lateral stiffness. More specifically, the sleeve 514F, the lower seal assembly 526F and the lower piston assembly 522F pivot relative to the upper seal assembly 524F, and the upper piston assembly 520F. With this design, the vibration isolator 500F allows for lateral movement.

Additionally, in FIG. 5F, the lower piston assembly 522F is fixedly secured and coupled to the first frame 501F with an annular shaped, first frame connector 551F, and the upper piston assembly 520F is fixedly secured and coupled to the second frame 503F with an annular shaped, second frame connector 553F. Further, the first frame 551F includes a pair of apertures 555F that allow the lower bridge support 594F to be connected to the lower piston assembly 522F.

Figure 6A:
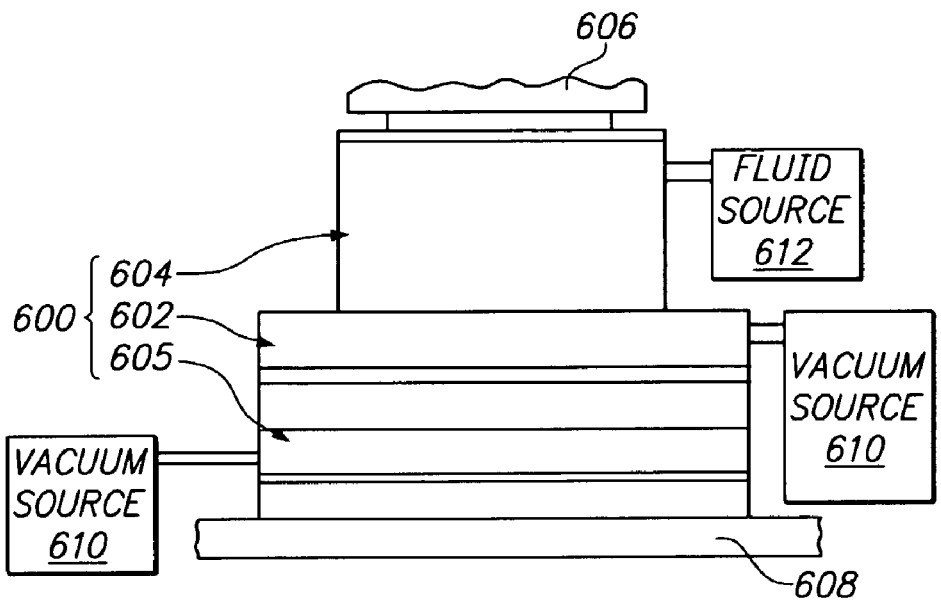
FIG. 6A is a side view of another embodiment of a vibration isolator having features of the present invention.

FIG. 6A illustrates a side view of another embodiment of a vibration isolator 600 that can be used in the isolation systems 66, 68, 70, 72 of FIG. 1. In this embodiment, the vibration isolator 600 includes a first system 602, a second system 604 and a third system 605. The first system 602 and the third system 605 cooperate to support at least a portion of a first assembly 606 relative to a second assembly 608 and the second system 604 adjusts for a change and/or shift in the location of a center of gravity of the first assembly 606 and/or a change in atmospheric pressure. In this embodiment, the first system 602 and the third system 605 are vacuum type actuators that each include a vacuum source 610 and the second system 604 that is a fluid type actuator that includes a fluid source 612. The design of the components of the vibration isolator 600 can be varied to suit the intended use of the vibration isolator 600.

Figure 6B:
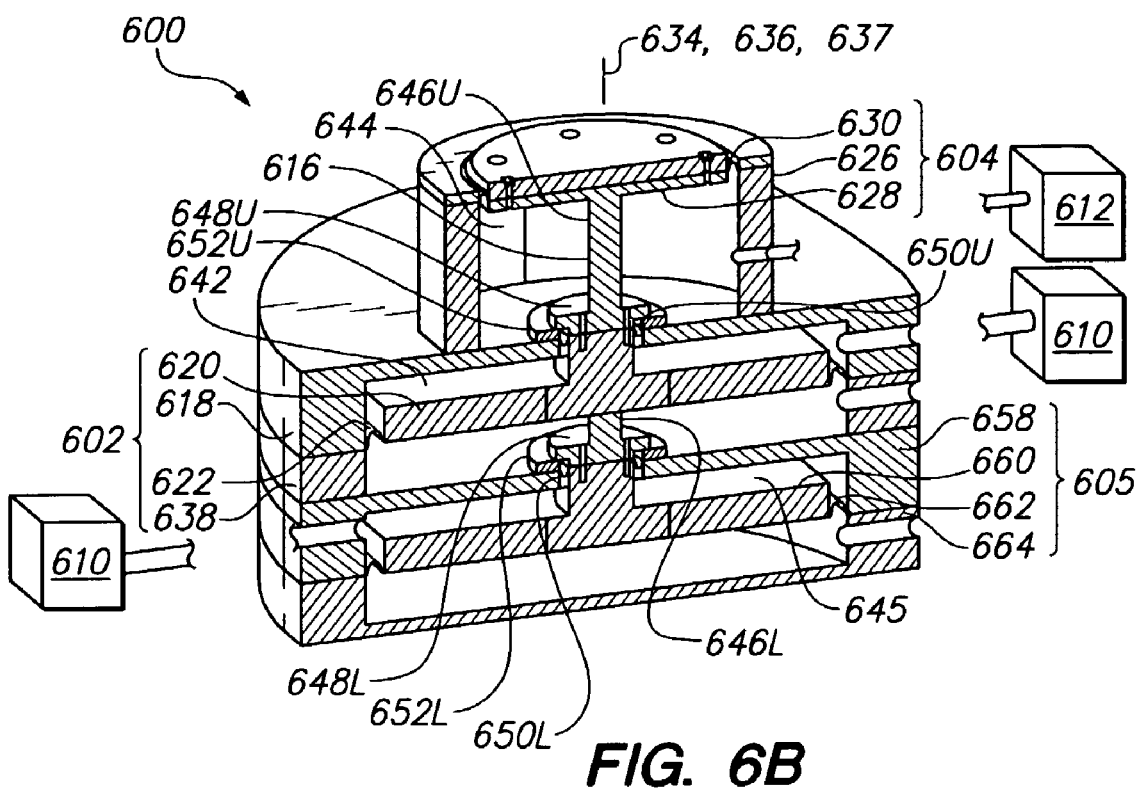
FIG. 6B is a cut-away perspective view of the vibration isolator of FIG. 6A.

FIG. 6B illustrates a cross-sectional, perspective view of the vibration isolator 600 of FIG. 6A. In this embodiment, the vibration isolator 600 includes a system connector 616 that directly couples the systems 602, 605 to the second system 604 so that the systems 602, 604, 605 act in parallel and move concurrently.

In this embodiment, the first system 602 includes a first cylinder 618, a first piston 620, a first seal 622, a first clamp 638, and the vacuum source 610 that are similar to the corresponding components described above and illustrated in FIGS. 2A–2D. Similarly, the third system 605 includes a third cylinder 658, a third piston 660, a third seal 662, a third clamp 664, and the vacuum source 610 that are similar to the corresponding component illustrated in FIGS. 2A–2D. The stacked vacuum actuators allow for a smaller footprint of the isolator 600 for the same lifting, supporting capacity.

In FIG. 6B, the second system 604 includes a second cylinder 626, a second piston 628, a second seal 630, and the fluid source 612 that are similar to the corresponding components described above and illustrated in FIGS. 2A–2D. In this embodiment, the second system 604 can also or alternately include (i) a mover assembly (not shown) similar to that illustrated in FIG. 3B and described above, (ii) a mass adjuster (not shown) similar to that illustrated in FIG. 4B and described above, (iii) a repulsion type assembly (not shown) similar to that illustrated in FIGS. 7A and 7B that utilizes a first permanent magnet section and a spaced apart second permanent magnet section, and/or (iv) an attraction type system (not shown) similar to that illustrated in FIG. 7C that utilizes a magnet section and a spaced apart magnetically permeable section.

The first piston 620 moves within the first cylinder 618 along a first axis 634, the second piston 628 moves within the second cylinder 626 along a second axis 636, and the third piston 660 moves with the third cylinder 658 along a third axis 637. The second system 604 is stacked on top and positioned directly above the systems 602, 605 and the first axes 634, 636, 637 are substantially coaxial. Further, the system connector 616 mechanically couples and connects the pistons 620, 628, 660 together so that the pistons 620, 628, 660 move concurrently. With this design, the pistons 620, 626, 660 cooperate to dampen vibration and support the load. Stated another way, each of the pistons 620, 628, 660 is connected to the load.

It should be noted that in this embodiment, the diameter of the first cylinder 618 and the third cylinder 658 is larger than the diameter of the second cylinder 626. This allows the systems 602, 605 to carry the majority of the load and the second system 604 to adjust for shifts in the center of gravity of the first assembly 606 and/or adjust for a change in atmospheric pressure. Further, the diameter of the first cylinder 618 and the third cylinder 658 are approximately the same. Alternately, for example, the diameter of the first cylinder 618 and the third cylinder 658 can be different.

A first clamp 638 of the first system 602 includes an aperture or multiple apertures so that the pressure below each the first piston 620 is equal to the atmospheric pressure. Further, a third clamp 664 of the third system 605 includes an aperture or multiple apertures so that the pressure below the third piston is equal to the atmospheric pressure. For the first system 602, the first piston 620 cooperates with the first cylinder 618 and the first seal 622 to define a first chamber 642 above the first piston 620. Somewhat similarly, the second piston 628 cooperates with the second cylinder 626 and the second seal 630 to define a second chamber 644 below the second piston 628. Further, the third piston 660 cooperates with the third cylinder 658 and the third seal to define a third chamber 645 above the third piston 660.

The vacuum sources 610 are in fluid communication with the first chamber 642 and the third chamber 645 and the fluid source 612 is in fluid communication with the second chamber 644. The control system 28 (illustrated in FIG. 1) actively controls the vacuum sources 610 to control the pressures in the chambers 642, 645 and the fluid source 612 to control the pressure in the second chamber 644. More specifically, in this embodiment, the control system 28 controls the vacuum source 610 of each system 602, 605 to remove fluid from the chambers 642, 645 so that a first chamber pressure above the first piston 620 and a third chamber pressure above the third piston 660 is less than the atmospheric pressure. The amount of differential between the pressures and the atmospheric pressure can be varied. Typically, atmospheric pressure is approximately 14.7 psi. With this design, the pressure differential is less than approximately 14.7 psi and typically between approximately 14.65 psi and 14.68 psi. FIG. 6B illustrates that the first system 602 and the third system 605 each includes a separate vacuum source 610. With this design, the first chamber pressure in each chamber 642, 645 can be the same or different. As a result of this design, the control system can independently control the pressure each of the chambers 642, 645. Alternately, for example, a single vacuum source can be used for each system 602, 605 and the chamber 642, 645 can be in fluid communication. With this design, the pressure in the first chamber 642 is substantially equal to the pressure in the third chamber 645.

Somewhat similarly, the control system 28 actively controls the fluid source 612 to add fluid to the second chamber 644 so that the second chamber pressure in the second chamber 644, below the second piston 628 is greater than the atmospheric pressure above the second piston 628. The amount of differential between the second chamber pressure and the atmospheric pressure can be varied. The pressure differential is typically between approximately 0 psi and 60 psi.

Stated another way, the control system 28 actively controls and adjusts the pressure in each of the chambers 642, 644, 645. With this design, the control system 28 can easily adjust the force characteristics and the height of the vibration isolator 600. It should be noted that the systems 602, 605 are designed to carry the majority of the load. Further, the second system 604 is used to adjust for shifts in a center of gravity of the first assembly 606 or a change in atmospheric pressure.

The system connector 616 mechanically and rigidly connects the pistons 620, 628, 660 together so that the pistons 620, 628, 660 move concurrently and are connected together to the load. The design of the system connector 616 can be varied to suit the design requirements of the vibration isolator 600. In this embodiment, some of the components of the system connector 616 are formed as part of the pistons 620, 628, 660. More specifically, referring to FIG. 6B, the system connector 616 includes (i) a rigid, upper connector shaft 646U that extends and cantilevers downward from the second piston 628 along the axes 634, 636 to the first piston 620, (ii) an upper shaft attacher 648U, e.g. a plurality of bolts, that secure the bottom of the upper connector shaft 646U to the first piston 620, and (iii) an upper connector seal 650U that allows the upper shaft attacher 648U to extend through the chambers 642, 644 while sealing the first chamber 642 from the second chamber 644, (iv) a rigid, lower connector shaft 646L that extends and cantilevers downward from the first piston 620 along the axes 634, 637 to the third piston 660, (ii) a lower shaft attacher 648L, e.g. a plurality of bolts, that secure the bottom of the lower connector shaft 646L to the third piston 660, and (iii) a lower connector seal 650L that allows the lower shaft attacher 648L to extend through the chamber 645 while sealing the chambers 645. An upper connector clamp 652U seals an outer perimeter of the upper connector seal 650U to the top of the first cylinder 618 and an inner perimeter of the upper connector seal 650U is sealed to the upper connector shaft 646U, and a lower connector clamp 652L seals an outer perimeter of the lower connector seal 650L to the top of the third cylinder 658 and an inner perimeter of the lower connector seal 650L is sealed to the lower connector shaft 646L.

Figure 7A:
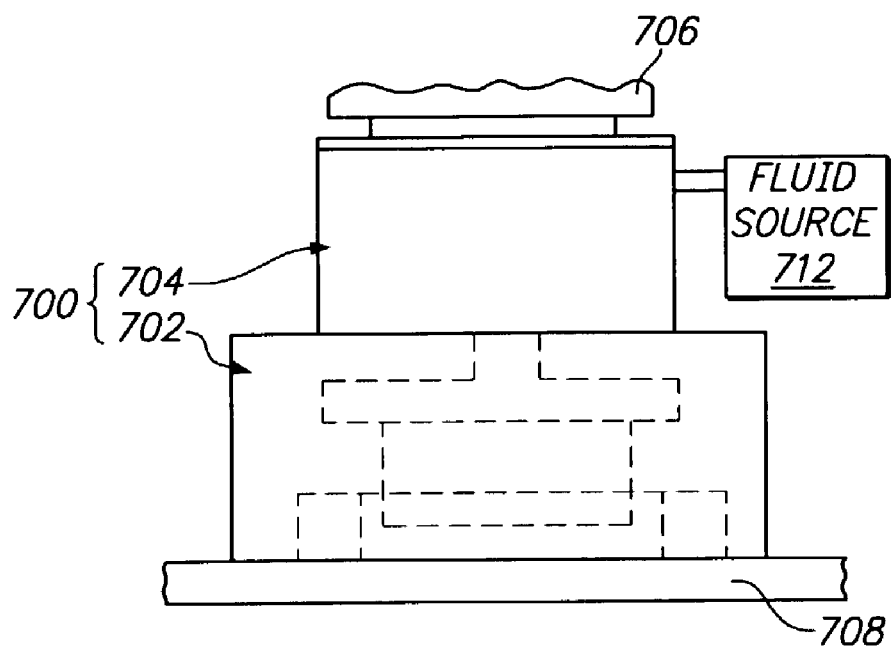
FIG. 7A is a side view of another embodiment of a vibration isolator having features of the present invention.

FIG. 7A illustrates a side view of another embodiment of a vibration isolator 700 that can be used in the isolation systems 66, 68, 70, 72 of FIG. 1. In this embodiment, the vibration isolator 700 includes a first system 702 (illustrated in phantom) and a second system 704. The first system 702 supports at least a portion of a first assembly 706 relative to a second assembly 708 and the second system 704 adjusts for a change and/or shift in the location of a center of gravity of the first assembly 706. In this embodiment, first system 702 is a repulsion type assembly and the second system 704 is a fluid type actuator that includes a fluid source 712. Thus, the first system 702 function differently from the second system 704. The design of the components of the vibration isolator 700 can be varied to suit the intended use of the vibration isolator 700.

Figure 7B:
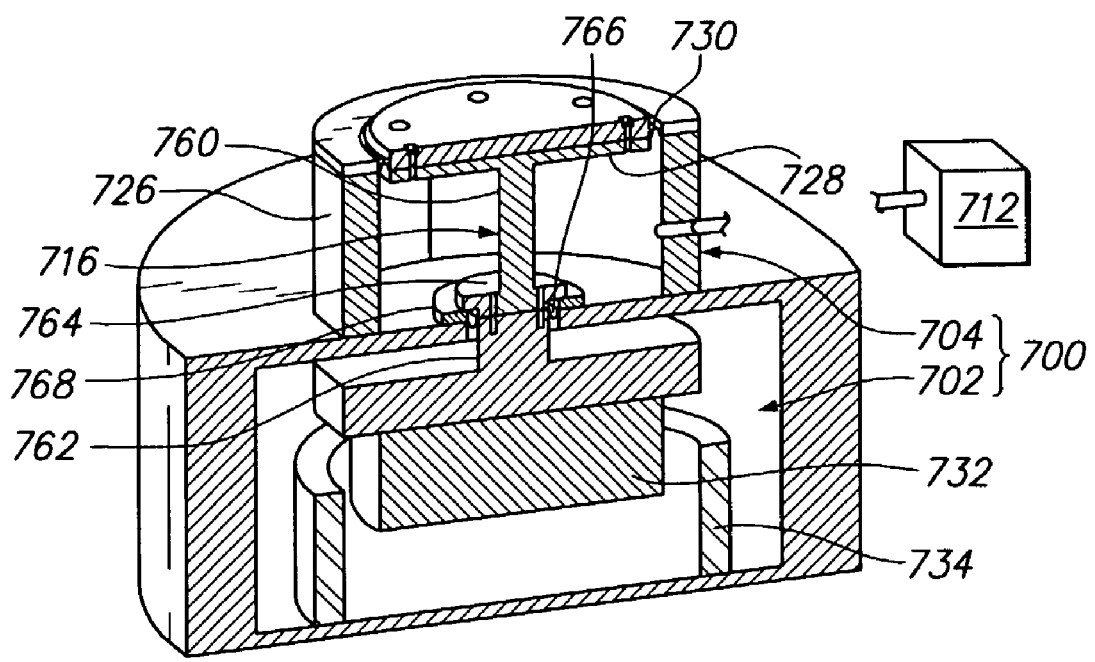
FIG. 7B is a cut-away perspective view of the vibration isolator of FIG. 7A.

FIG. 7B illustrates a cross-sectional, perspective view of the vibration isolator 700 of FIG. 7A. In this embodiment, the vibration isolator 700 includes a system connector 716 that directly couples the first system 702 to the second system 704 so that the systems 702, 704 act in parallel.

In FIG. 7B, the second system 704 includes a second cylinder 726, a second piston 728, a second seal 730, and the fluid source 712 that are similar to the corresponding components described above and illustrated in FIGS. 2A–2D. Alternately, for example, the second system 704 can include (i) a mover assembly (not shown) similar to that illustrated in FIG. 3B and described above, (ii) a mass adjuster (not shown) similar to that illustrated in FIG. 4B and described above, and/or (iii) an attraction type system (not shown) similar to that illustrated in FIG. 7C that utilizes a magnet section and a spaced apart magnetically permeable section.

The first system 702 includes a first permanent magnet section 732, and a spaced apart, second permanent magnet section 734. In this embodiment, the first magnet section 732 includes a single, generally right cylindrical shaped permanent magnet that is secured and coupled to the system connector 716. In this embodiment, the second magnet section 734 is generally tubular shaped and encircles a portion of the first magnet section 732. The magnet sections 732, 734 are oriented so that the poles are reversed. As a result thereof, the first magnet section 732 is repulsed by the second magnet section 734. In this design, the magnet sections 732, 734 are designed and tested to provide the desired amount of force. Each magnet section 732, 734 includes one or more permanent magnets such as NdFeB.

Further, the control system 28 actively controls the fluid source 712 to add or remove fluid from the cylinder 726. With this design, the control system 28 can adjust the damping characteristics, adjust for changes in the center of gravity, and the height of the vibration isolator 700. It should be noted that the first system 702 is again designed to carry the majority of the load of the first assembly 706.

Additionally, with this embodiment, a mover (not shown) such as a voice coil motor can be added in series with the vibration isolator 700 to better control a high bandwith dynamic load.

The system connector 716 mechanically and rigidly connects the second piston 728 to the first magnetic section 732. The design of the system connector 716 can be varied to suit the design requirements of the vibration isolator 700. In FIG. 7B, the system connector 716 includes (i) a rigid, upper connector shaft 760 that extends and cantilevers downward from the second piston 728 (ii) a lower connector shaft 762 that extends up from the second magnetic section 732, (iii) a shaft attacher 764, e.g. a plurality of bolts, that secure the bottom of the shafts 760, 762 together, (iv) a connector seal 766, and (v) a connector clamp 768.

Figure 7C:
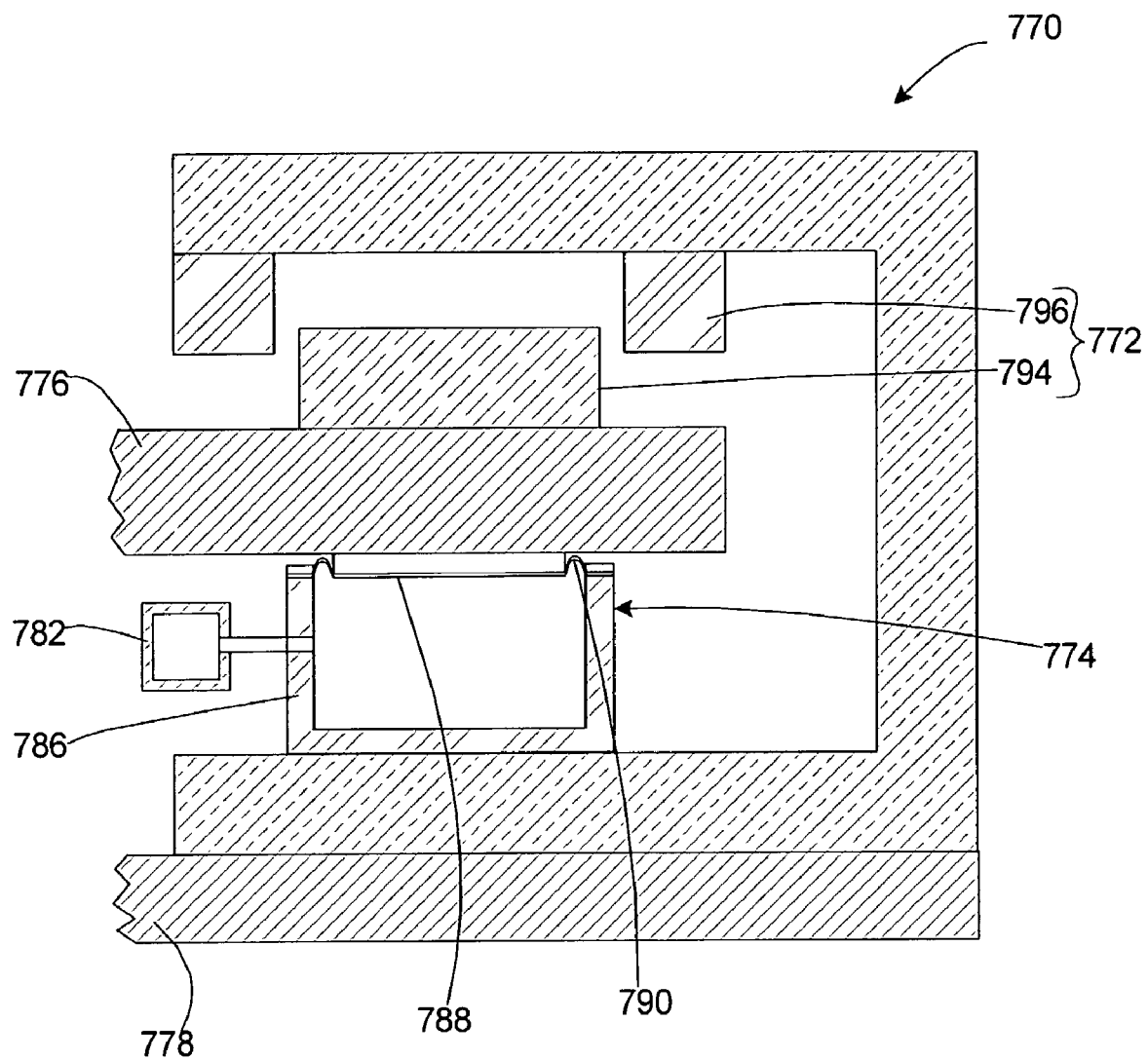
FIG. 7C is a cutaway perspective view of still another embodiment of a vibration isolator having features of the present invention.

FIG. 7C illustrates a side cross-sectional view of yet another embodiment of a vibration isolator 770 that can be used in the isolation systems 66, 68, 70, 72 of FIG. 1. In this embodiment, the vibration isolator 770 includes a first system 772 and a second system 774 that is coupled to the first system 772. The first system 702 supports at least a portion of a first assembly 776 relative to a second assembly 778 and the second system 774 adjusts for a change and/or shift in the location of a center of gravity of the first assembly 776. Additionally, the first system 772 and the second system 774 are positioned on opposite sides of the first assembly 776. In this embodiment, first system 772 is an attraction type assembly and the second system 774 is a fluid type actuator that includes a fluid source 782. Thus, the first system 772 functions differently from the second system 774. The design of the components of the vibration isolator 770 can be varied to suit the intended use of the vibration isolator 770.

In FIG. 7C, the second system 774 includes a cylinder 786, a piston 788, a seal 790, and the fluid source 782 that are similar to the corresponding components described above and illustrated in FIGS. 2A–2D. Alternately, for example, the second system 774 can include (i) a mover assembly (not shown) similar to that illustrated in FIG. 3B and described above, (ii) a mass adjuster (not shown) similar to that illustrated in FIG. 4B and described above, and/or (iii) a repulsion type assembly (not shown) similar to that illustrated in FIGS. 7A and 7B that utilizes a first permanent magnet section and a spaced apart second permanent magnet section.

The first system 772 includes a magnet section 794, and a spaced apart magnetically permeable section 796. In this embodiment, the magnet section 794 is generally right cylindrical shaped and is secured and coupled to the first assembly 776. The magnet section 794 can include one or more permanent magnets such as NdFeB. Also, in this embodiment, the magnetically permeable section 796 is generally tubular shaped and encircles a portion of the magnet section 794. The magnetically permeable section 796 is made from a material that is attracted to the magnet section 794. Suitable materials include iron or steel. With this design, the permeable section 796 is attracted to the magnet section 794.

In this design, the magnet section 794 and the permeable section 796 are designed and tested to provide the desired amount of force. Further, the control system 28 actively controls the fluid source 782 to add or remove fluid from the cylinder 786. With this design, the control system 28 can adjust the damping characteristics, adjust for changes in the center of gravity, and the height of the vibration isolator 770. It should be noted that the first system 772 is again designed to carry the majority of the load of the vibration isolator 770.

Additionally, with this embodiment, a mover (not shown) such as a voice coil motor can be added in series with the vibration isolator 700 to better control a high bandwidth dynamic load.

Alternately, the magnetically permeable section 796 could be replaced with a permanent magnet configured to provide a repulsive force with the magnetic section 794. Or, the magnetically permeable section 796 and the magnet section 794 could be reversed.

The photolithography system (an exposure apparatus) and the vibration isolators illustrated in the Figures can be built by assembling various subsystems, including each element listed in the appended claims, in such a manner that pre-scribed mechanical accuracy, electrical accuracy, and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems. Once a photolithography system is assembled using the various subsystems, a total adjustment is performed to make sure that accuracy is maintained in the complete photolithography system. Additionally, it is desirable to manufacture an exposure system in a clean room where the temperature and cleanliness are controlled.

Figure 8A:
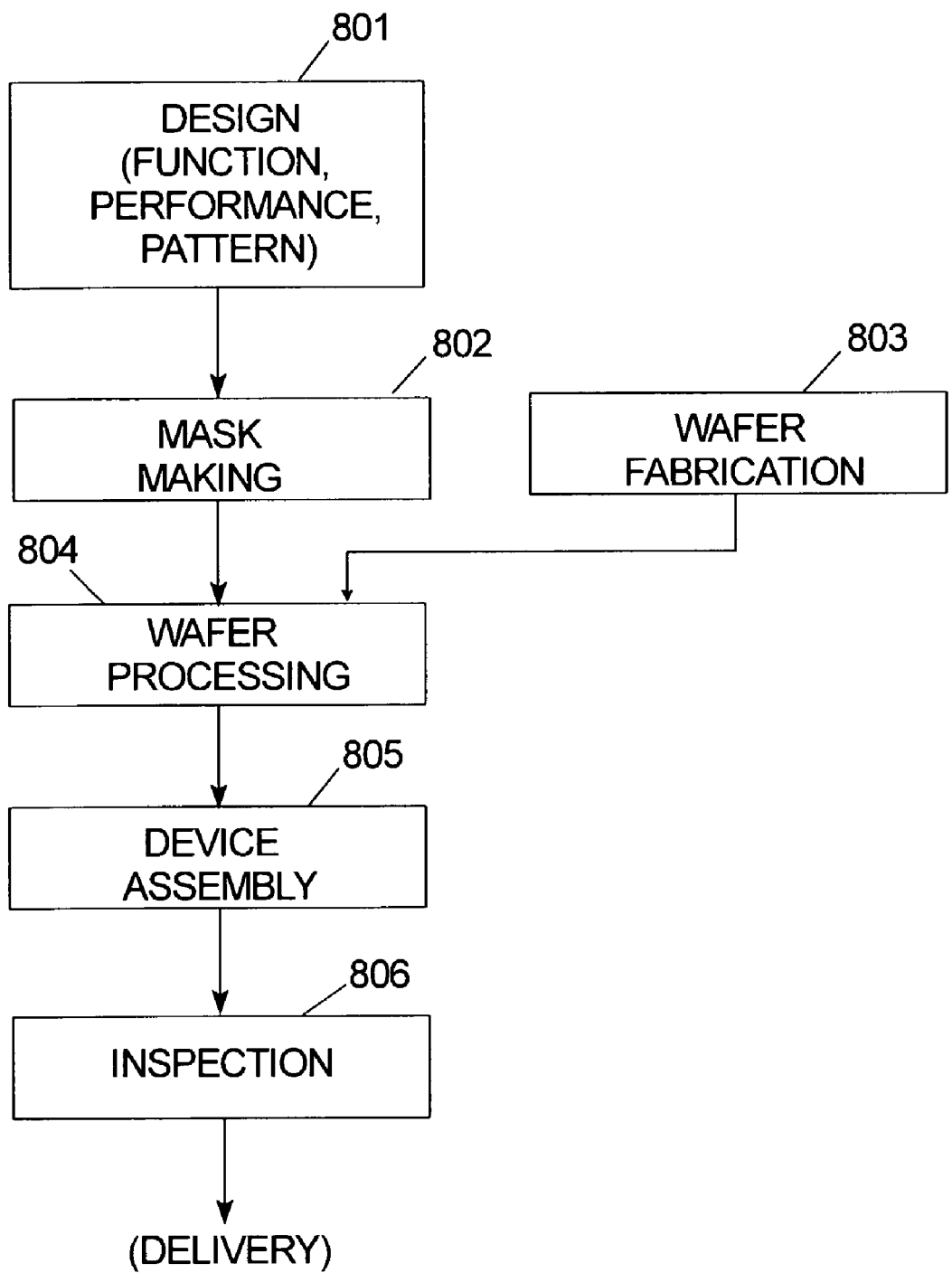
FIG. 8A is a flow chart that outlines a process for manufacturing a device in accordance with the present invention.

Further, semiconductor devices can be fabricated using the above described systems, by the process shown generally in FIG. 8A. In step 801, the device's function and performance characteristics are designed. Next, in step 802, a mask (reticle) having a pattern is designed according to the previous designing step, and in a parallel step 803, a wafer is made from a silicon material. The mask pattern designed in step 802 is exposed onto the wafer from step 803 in step 804 by a hotolithography system described hereinabove in accordance with the present invention. In step 805, the semiconductor device is assembled (including the dicing process, bonding process and packaging process), finally, the device is then inspected in step 806.

Figure 8B:
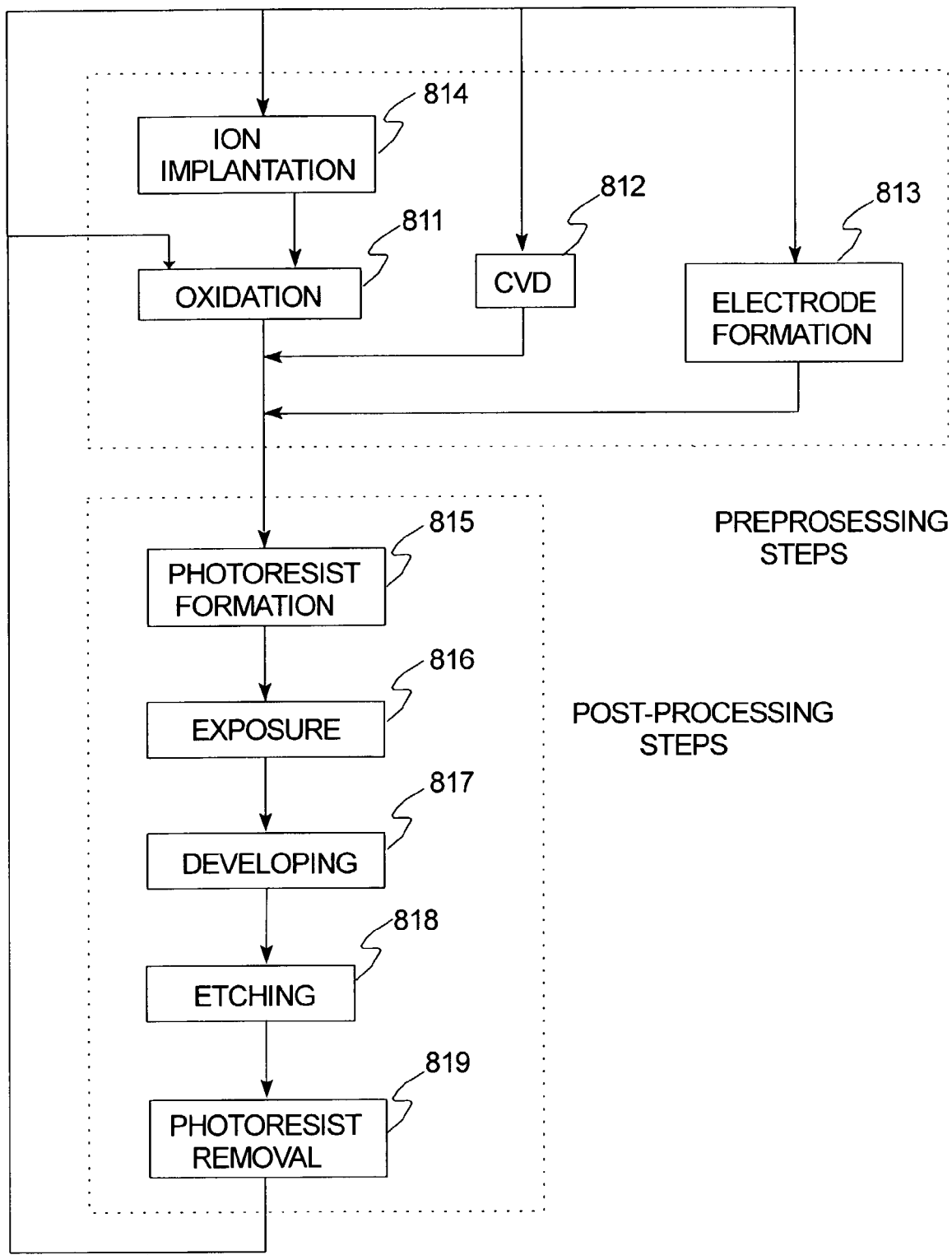
FIG. 8B is a flow chart that outlines device processing in more detail.

FIG. 8B illustrates a detailed flowchart example of the above-mentioned step 804 in the case of fabricating semiconductor devices. In FIG. 8B, in step 811 (oxidation step), the wafer surface is oxidized. In step 812 (CVD step), an insulation film is formed on the wafer surface. In step 813 (electrode formation step), electrodes are formed on the wafer by vapor deposition. In step 814 (ion implantation step), ions are implanted in the wafer. The above mentioned steps 811–814 form the preprocessing steps for wafers during wafer processing, and selection is made at each step according to processing requirements.

At each stage of wafer processing, when the above-mentioned preprocessing steps have been completed, the following post-processing steps are implemented. During post-processing, first, in step 815 (photoresist formation step), photoresist is applied to a wafer. Next, in step 816 (exposure step), the above-mentioned exposure device is used to transfer the circuit pattern of a mask (reticle) to a wafer. Then, in step 817 (developing step), the exposed wafer is developed, and in step 818 (etching step), parts other than residual photoresist (exposed material surface) are removed by etching. In step 819 (photoresist removal step), unnecessary photoresist remaining after etching is removed. Multiple circuit patterns are formed by repetition of these preprocessing and post-processing steps.

While the particular vibration isolator and exposure apparatus as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A vibration isolator for isolating a first assembly from vibration from a second assembly, the first assembly having a center of gravity, the vibration isolator comprising:
   a first system that supports at least a portion of the first assembly relative to the second assembly;
   a second system that is coupled to the first system, the second system adjusting for a change in the location of the center of gravity of the first assembly, wherein one of the systems is stacked directly on top of the other system; and
   a control system that actively controls the first system and the second system.

2. The vibration isolator of claim 1 wherein the first system is different from the second system.

3. The vibration isolator of claim 1 wherein the second system compensates for fluctuations in the atmospheric pressure near the second system.

4. The vibration isolator of claim 1 wherein the second system includes a mass controller that changes the mass that is coupled to the first system.

5. The vibration isolator of claim 1 wherein the second system includes a mover.

6. The vibration isolator of claim 1 wherein the first system includes a first cylinder and a first piston that moves within the first cylinder, the first piston cooperating with the first cylinder to define a first chamber and wherein the second system includes a second cylinder and a second piston that moves relative to the second cylinder, the second piston cooperating with the second cylinder to define a second chamber.

7. The vibration isolator of claim 6 wherein the first chamber is maintained at a first chamber pressure that is less than the atmospheric pressure and the second chamber is maintained at a second chamber pressure that is greater than the atmospheric pressure.

8. The vibration isolator of claim 6 further comprising a third system that includes a third cylinder and a third piston coupled to the first piston, the third piston moving within the third cylinder and cooperating with the third cylinder to define a third chamber, wherein the third chamber is maintained at a pressure that is less than the atmospheric pressure.

9. The vibration isolator of claim 6 wherein the first chamber is maintained at a first chamber pressure that is less than a second chamber pressure in the second chamber.

10. The vibration isolator of claim 6 further comprising a first connector that couples the first piston to the second piston so that the first piston and the second piston move concurrently.

11. The vibration isolator of claim 1 wherein the first system includes a magnet section and a spaced apart magnetically permeable section.

12. The vibration isolator of claim 11 wherein the second system includes a second cylinder and a second piston that moves relative to the second cylinder, the second piston cooperating with the second cylinder to define a second chamber.

13. The vibration isolator of claim 12 wherein the second chamber is maintained at a second chamber pressure that is greater than atmospheric pressure.

14. The vibration isolator of claim 1 wherein the first system includes a first magnet section and a spaced apart second magnet section.

15. The vibration isolator of claim 14 wherein the second system is a fluid type actuator.

16. The vibration isolator of claim 1 wherein at least a portion of one of the systems pivots relative to the other system to allow for lateral movement of the first assembly relative to the second assembly.

17. The vibration isolator of claim 16 including a plurality of first systems and a plurality of second systems that are coupled together.

18. The vibration isolator of claim 1 including a plurality of first systems and a plurality of second systems that are coupled together.

19. An isolation system including the vibration isolator of claim 1.

20. An exposure apparatus including a first assembly, a second assembly, and the vibration isolator of claim 1 securing the first assembly to the second assembly.

21. A device comprising a substrate having an image that was formed by the exposure apparatus of claim 20.

22. A wafer having an image that was formed by the exposure apparatus of claim 20.

23. A vibration isolator for isolating a first assembly from vibration from a second assembly, the first assembly having a center of gravity, the vibration isolator comprising:
a first system that supports at least a portion of the first assembly relative to the second assembly, wherein the first system includes a first cylinder and a first piston that moves within the first cylinder, the first piston cooperating with the first cylinder to define a first chamber, wherein the first chamber is maintained at a pressure that is less than the pressure outside the first chamber; and
a second system that is coupled to the first system, the second system adjusting for a change in the location of the center of gravity of the first assembly.

24. A vibration isolator for isolating a first assembly from vibration from a second assembly, the first assembly having a center of gravity, the vibration isolator comprising:
a first system that supports at least a portion of the first assembly relative to the second assembly, wherein the first system includes a first cylinder and a first piston that moves within the first cylinder, the first piston cooperating with the first cylinder to define a first chamber, wherein the first chamber is maintained at a pressure that is less than the atmospheric pressure; and
a second system that is coupled to the first system, the second system adjusting for a change in the location of the center of gravity of the first assembly.

25. The vibration isolator of claim 24 wherein the second system includes a second cylinder and a second piston that moves within the second cylinder, the second piston cooperating with the second cylinder to define a second chamber, wherein the second chamber is maintained at a pressure that is greater than the atmospheric pressure.

26. The vibration isolator of claim 24 wherein the second system includes a mass controller that changes the mass that is supported by the first system.

27. The vibration isolator of claim 24 wherein the second system includes a mover that adjusts the position of the first assembly relative to the second assembly.

28. The vibration isolator of claim 24 further comprising a third system that includes a third cylinder and a third piston coupled to the first piston, the third piston moving within the third cylinder and cooperating with the third cylinder to define a third chamber, wherein the third chamber is maintained at a pressure that is less than the atmospheric pressure.

29. A vibration isolator for isolating a first assembly from vibration from a second assembly, the vibration isolator comprising:
a first system that supports at least a portion of the first assembly relative to the second assembly;
a second system that is coupled to the first system, the second system being functionally different from the first system, wherein one of the systems is stacked directly on top of the other system; and
a control system that actively controls the first system and the second system.

30. The vibration isolator of claim 29 wherein the second system adjusts for a change in the location of a center of gravity of the first assembly.

31. The vibration isolator of claim 29 wherein the second system compensates for fluctuations in the atmospheric pressure near the second system.

32. The vibration isolator of claim 29 wherein the second system includes a mass controller that changes the mass of that is coupled to the first system.

33. The vibration isolator of claim 29 wherein the second system includes a mover.

34. The vibration isolator of claim 29 wherein the first system includes a first cylinder and a first piston that moves within the first cylinder, the first piston cooperating with the first cylinder to define a first chamber and wherein the second system includes a second cylinder and a second piston that moves relative to the second cylinder, the second piston cooperating with the second cylinder to define a second chamber.

35. The vibration isolator of claim 34 wherein the first chamber is maintained at a first chamber pressure that is less than the atmospheric pressure and the second chamber is maintained at a second chamber pressure that is greater than the atmospheric pressure.

36. The vibration isolator of claim 34 further comprising a third system that includes a third cylinder and a third piston coupled to the first piston, the third piston moving within the third cylinder and cooperating with the third cylinder to define a third chamber, wherein the third chamber is maintained at a pressure that is less than the atmospheric pressure.

37. The vibration isolator of claim 34 wherein the first chamber is maintained at a first chamber pressure that is less than a second chamber pressure in the second chamber.

38. The vibration isolator of claim 34 further comprising a first connector that couples the first piston to the second piston so that the first piston and the second piston move concurrently.

39. The vibration isolator of claim 29 wherein the first system includes a magnet section and a spaced apart magnetically permeable section.

40. The vibration isolator of claim 39 wherein the second system includes a second cylinder and a second piston that moves relative to the second cylinder, the second piston cooperating with the second cylinder to define a second chamber.

41. The vibration isolator of claim 40 wherein the second chamber is maintained at a second chamber pressure that is greater than atmospheric pressure.

42. The vibration isolator of claim 29 wherein the first system includes a first magnet section and a spaced apart second magnet section.

43. The vibration isolator of claim 42 wherein the second system is a fluid type actuator.

44. The vibration isolator of claim 29 wherein at least a portion of one of the systems pivots relative to the other system to allow for lateral movement of the first assembly relative to the second assembly.

45. The vibration isolator of claim 44 including a plurality of first systems and a plurality of second systems that are coupled together.

46. The vibration isolator of claim 29 including a plurality of first systems and a plurality of second systems that are coupled together.

47. An isolation system including the vibration isolator of claim 29.

48. An exposure apparatus including a first assembly, a second assembly, and the vibration isolator of claim 29 securing the first assembly to the second assembly.

49. A device comprising a substrate having an image that was formed by the exposure apparatus of claim 48.

50. A wafer having an image that was formed by the exposure apparatus of claim 48.

51. A vibration isolator for isolating a first assembly from vibration from a second assembly, the vibration isolator comprising:
 a first system that supports at least a portion of the first assembly relative to the second assembly, wherein the first system includes a first cylinder and a first piston that moves within the first cylinder, the first piston cooperating with the first cylinder to define a first chamber, wherein the first chamber is maintained at a pressure that is less than the pressure outside the first chamber; and
 a second system that is coupled to the first system, the second system being functionally different from the first system.

52. A vibration isolator for isolating a first assembly from vibration from a second assembly, the vibration isolator comprising:
 a first system that supports at least a portion of the first assembly relative to the second assembly, wherein the first system includes a first cylinder and a first piston that moves within the first cylinder, the first piston cooperating with the first cylinder to define a first chamber, wherein the first chamber is maintained at a pressure that is less than the atmospheric pressure; and
 a second system that is coupled to the first system, the second system being functionally different from the first system.

53. The vibration isolator of claim 52 wherein the second system includes a second cylinder and a second piston that moves within the second cylinder, the second piston cooperating with the second cylinder to define a second chamber, wherein the second chamber is maintained at a pressure that is greater than the atmospheric pressure.

54. The vibration isolator of claim 52 wherein the second system includes a mass controller that changes the mass that is supported by the first system.

55. The vibration isolator of claim 52 wherein the second system includes a mover that adjusts the position of the first assembly to the second assembly.

56. The vibration isolator of claim 52 further comprising a third system that includes a third cylinder and a third piston coupled to the first piston, the third piston moving within the third cylinder and cooperating with the third cylinder to define a third chamber, wherein the third chamber is maintained at a pressure that is less than the atmospheric pressure.

57. A vibration isolator for isolating a first assembly from vibration from a second assembly, the vibration isolator comprising:
 a first system that supports at least a portion of the first assembly relative to the second assembly, the first system including a first cylinder and a first piston that moves within the first cylinder, the first piston cooperating with the first cylinder to define a first chamber, wherein the first chamber is maintained at a pressure that is less than the atmospheric pressure; and
 a third system that includes a third cylinder and a third piston that is coupled to the first piston, the third piston moving within the third cylinder and cooperating with the third cylinder to define a third chamber, wherein the third chamber is maintained at a pressure that is less than the atmospheric pressure.

58. The vibration isolator of claim 57 further comprising a second system that adjusts for a change in the location of a center of gravity of the first assembly, the second system being coupled to the first system.

59. The vibration isolator of claim 58 wherein the second system compensates for fluctuations in the atmospheric pressure near the second system.

60. The vibration isolator of claim 58 wherein the second system includes a second cylinder and a second piston that moves within the second cylinder, the second piston cooperating with the second cylinder to define a second chamber, wherein the second chamber is maintained at a pressure that is greater than the atmospheric pressure.

61. The vibration isolator of claim 58 wherein at least a portion of one of the systems pivots relative to the other system to allow for lateral movement of the first assembly relative to the second assembly.

62. The vibration isolator of claim 58 wherein the second system includes a mass controller that changes the mass that is supported by the first system.

63. The vibration isolator of claim 58 wherein the second system includes a mover that adjusts the position of the first piston.

64. The vibration isolator of claim 58 further comprising a connector that couples the first piston and to the second piston so that the first piston and the second piston move concurrently.

65. The vibration isolator of claim 57 wherein one of the pistons is positioned directly above the other piston.

66. An isolation system including the vibration isolator of claim 57.

67. An exposure apparatus including a first assembly, a second assembly, and the vibration isolator of claim 57 securing the first assembly to the second assembly.

68. A device comprising a substrate having an image that was formed by the exposure apparatus of claim 67.

69. A wafer having an image that was formed by the exposure apparatus of claim 67.

70. A method for making a vibration isolator for isolating a first assembly from vibration from a second assembly, the method comprising the steps of:
supporting the first assembly relative to the second assembly with a first system;
coupling a second system to the first system, the second system adjusting for a change in the location of a center of gravity of the first assembly, wherein one of the systems is stacked directly on top of the other system; and
actively controlling the first system and the second system with a control system.

71. The method of claim 70 further comprising the step of compensating for fluctuations in the atmospheric pressure near the second system with the second system.

72. The method of claim 70 wherein the step of supporting the first assembly includes the step of providing a first system that includes a first cylinder and a first piston that moves within the first cylinder, the first piston cooperating with the first cylinder to define a first chamber, wherein the first chamber is maintained at a pressure that is less than the atmospheric pressure.

73. The method of claim 72 wherein the step of coupling a second system includes the step of providing a second cylinder and a second piston that moves within the second cylinder, the second piston cooperating with the second cylinder to define a second chamber, wherein the second chamber is maintained at a pressure that is greater than the atmospheric pressure.

74. The method of claim 72 wherein the step of coupling a second system includes the step of providing a second system that includes a mass controller that changes the mass that is supported by the first system.

75. The method of claim 72 wherein the step of coupling a second system includes the step of providing a second system that includes a mover that adjusts the position of the first assembly relative to the second assembly.

76. The method of claim 72 wherein the step of supporting the first assembly includes the step of providing a first system that includes a magnet section and a magnetically permeable section that is attracted to the magnet section.

77. The method of claim 76 wherein the step of coupling the second system includes the steps of providing a fluid type actuator.

78. The method of claim 70 further comprising the step of coupling a third system to the first system, the third system including a third cylinder and a third piston coupled to the first piston, the third piston moving within the third cylinder and cooperating with the third cylinder to define a third chamber, wherein the third chamber is maintained at a pressure that is less than the atmospheric pressure.

79. The method of claim 70 wherein the step of supporting the first assembly includes the step of providing a first system that includes a first cylinder and a first piston that moves within the first cylinder, the first piston cooperating with the first cylinder to define a first chamber and wherein the step of coupling a second system includes the step of providing a second system that includes a second cylinder and a second piston that moves relative to the second cylinder, the second piston cooperating with the second cylinder to define a second chamber.

80. The method of claim 79 further comprising the step of maintaining the first chamber at a first chamber pressure that is less than the atmospheric pressure and the step of maintaining the second chamber at a second chamber pressure that is greater than atmospheric pressure.

81. The method of claim 80 further comprising the step of coupling a third system to the first system, the third system including a third cylinder and a third piston coupled to the first piston, the third piston moving within the third cylinder and cooperating with the third cylinder to define a third chamber, wherein the third chamber is maintained at a pressure that is less than the atmospheric pressure.

82. The method of claim 79 further comprising the step of coupling the first piston and to the second piston so that the first piston and the second piston move concurrently.

83. The method of claim 70 wherein the step of coupling a second system includes the step of providing a second cylinder and a second piston that moves within the second cylinder, the second piston cooperating with the second cylinder to define a second chamber, wherein the second chamber is maintained at a pressure that is greater than the atmospheric pressure.

84. The method of claim 70 wherein the step of coupling the second system includes the step of providing a second system that includes a mass controller that changes the mass that is supported by the first system.

85. The method of claim 70 wherein the step of coupling the second system includes the step of providing a second system that includes a mover that adjusts the position of the first assembly to the second assembly.

86. The method of claim 70 wherein the step of supporting the first assembly includes the steps of providing a first magnetic section and a second magnetic section that is repulsed by the first magnetic section.

87. A method for making an isolation system including the step of providing a vibration isolator made in accordance with claim 70.

88. A method for providing an exposure apparatus including the step of providing a first assembly, providing a second assembly, and securing the first assembly to the second assembly with a vibration isolator made by the method of claim 70.

89. A method of making a wafer utilizing the exposure apparatus made by the method of claim 88.

90. A method of making a device including at least an exposure process, wherein the exposure process utilizes the exposure apparatus made by the method of claim 88.

91. A method for making a vibration isolator for isolating a first assembly from vibration from a second assembly, the method comprising the steps of:
supporting the first assembly relative to the second assembly with a first system and a second system that are coupled together, wherein the first system is functionally different from the second system, and wherein one of the systems is stacked directly on top of the other system; and
actively controlling the first system and the second system with a control system.

92. The method of claim 91 further comprising the step of compensating for fluctuations in the atmospheric pressure near the second system with the second system.

93. The method of claim 91 wherein the step of supporting the first assembly includes the step of providing a first system that includes a first cylinder and a first piston that moves within the first cylinder, the first piston cooperating with the first cylinder to define a first chamber, wherein the first chamber is maintained at a pressure that is less than the atmospheric pressure.

94. The method of claim 93 wherein the step of supporting the first assembly includes the step of providing a second system that includes a second cylinder and a second piston that moves within the second cylinder, the second piston cooperating with the second cylinder to define a second chamber, wherein the second chamber is maintained at a pressure that is greater than the atmospheric pressure.

95. The method of claim 93 wherein the step of supporting the first assembly includes the step of providing a second system that includes a mass controller that changes the mass that is supported by the first system.

96. The method of claim 93 wherein the step of supporting the first assembly includes the step of providing a second system that includes a mover that adjusts the position of the first assembly.

97. The method of claim 93 further comprising the step of coupling a third system to the first system, the third system including a third cylinder and a third piston coupled to the first piston, the third piston moving within the third cylinder and cooperating with the third cylinder to define a third chamber, wherein the third chamber is maintained at a pressure that is less than the atmospheric pressure.

98. The method of claim 93 wherein the step of supporting the first assembly includes the step of providing a first system that includes the steps of providing a magnet section and providing a magnetically permeable section that is attracted to the magnet section.

99. A method for making an isolation system including the step of providing a vibration isolator made in accordance with claim 91.

100. A method for providing an exposure apparatus including the step of providing a first assembly, providing a second assembly, and securing the first assembly to the second assembly with a vibration isolator made by the method of claim 91.

101. A method of making a wafer utilizing the exposure apparatus made by the method of claim 100.

102. A method of making a device including at least an exposure process, wherein the exposure process utilizes the exposure apparatus made by the method of claim 100.

* * * * *